US012774046B1

(12) United States Patent
Ouyang

(10) Patent No.: US 12,774,046 B1
(45) Date of Patent: Oct. 27, 2026

(54) ANTI-TILT GOOSENECK BALL AND ANTI-TILT METHOD

(71) Applicant: Long Ouyang, Huanggang (CN)

(72) Inventor: Long Ouyang, Huanggang (CN)

( * ) Notice: Subject to any disclaimer, the term of this patent is extended or adjusted under 35 U.S.C. 154(b) by 0 days.

(21) Appl. No.: 19/274,799

(22) Filed: Jul. 21, 2025

(51) Int. Cl.
*B62D 53/08* (2006.01)
*B60D 1/06* (2006.01)
*B60D 1/07* (2006.01)
*B60D 1/24* (2006.01)

(52) U.S. Cl.
CPC ................................ *B62D 53/0871* (2013.01)

(58) Field of Classification Search
CPC ............ B62D 53/0871; B62D 53/0878; B62D 53/0885; B60D 1/015; B60D 1/06; B60D 1/065; B60D 1/241; B60D 1/07; B60D 1/30
USPC .............. 280/901, 417.1, 483, 485, 506, 511
See application file for complete search history.

(56) References Cited

U.S. PATENT DOCUMENTS 3,796,444 A * 3/1974 Hixon ...................... B60D 1/06 280/483
4,176,853 A * 12/1979 Brock .................... B60D 1/065 280/901
4,183,548 A * 1/1980 Schneckloth ............ B60D 1/07 280/901
5,246,244 A * 9/1993 Colibert ............. B62D 53/0828 280/901
5,513,869 A * 5/1996 Putnam .............. B62D 53/0828 280/901
5,683,094 A * 11/1997 Gullickson ............ B60D 1/065 280/485
5,788,257 A * 8/1998 Meyerhofer ............. B60D 1/07 280/433
6,382,656 B1 * 5/2002 Johnson, Jr. ............. B60D 1/60 280/506
10,377,195 B2 * 8/2019 Pulliam .................... B60D 1/52
D1,079,564 S * 6/2025 Gao ............................. D12/162
2003/0034633 A1 * 2/2003 Belinky ................... B60D 1/06 280/507
2006/0087100 A1 * 4/2006 Gurtler .................... B60D 1/06 280/901
2007/0029756 A1 * 2/2007 Quargerg ............... B60D 1/143 280/447

* cited by examiner

*Primary Examiner* — Anne Marie M Boehler
(74) *Attorney, Agent, or Firm* — Birchwood IP

(57) ABSTRACT

An anti-tilt gooseneck ball and an anti-tilt method are provided. The anti-tilt gooseneck ball includes a ball body configured to connect with a trailer ball cover; an installation body, which is fixedly connected to the ball body and configured to connect with an installation base; and an anti-tilt body, the anti-tilt body is sleeved on an outer circumference of the ball body, and when the ball boy is threaded through a coupler and connected to the coupler, one side of the anti-tilt body abuts against the coupler, and the other side of the anti-tilt body abuts against the ball body. This application has an effect of rendering a connection between the ball body of the gooseneck ball and the coupler more stable and less prone to tilting.

7 Claims, 31 Drawing Sheets

ANTI-TILT GOOSENECK BALL AND ANTI-TILT METHOD

TECHNICAL FIELD

The present disclosure relates to the field of gooseneck ball technologies, and in particular, to an anti-tilt gooseneck ball and an anti-tilt method.

BACKGROUND

At present, more and more users in the domestic market are beginning to use and engage in outdoor sports, including RVs, trailers, yachts, and other products. These large products require trailer connections with vehicles during use to enable RVs, trailers, yachts, and other vehicles to travel.

Generally speaking, the gooseneck ball includes a ball body and an installation body. The gooseneck ball is fixedly connected to the installation base at a rear of the vehicle through the installation base at the rear of the vehicle. The trailer ball cover is provided on a front of the RV, trailer, and yacht, which can press and fix the ball body of the gooseneck ball inside the trailer ball cover to complete the trailer connection between the RV, trailer, yacht, and vehicle.

Regarding the relevant technologies mentioned above, the existing gooseneck ball is prone to tilting at the connection between the ball body and the coupler during towing, which can easily lead to traffic accidents when towing.

SUMMARY

In order to make the connection between the ball body of the gooseneck ball and the coupler more stable and less prone to tilting, this application provides an anti-tilt gooseneck ball and an anti-tilt method.

The anti-tilt gooseneck ball and anti-tilt method provided in this application adopt the following technical solution.

An anti-tilt gooseneck ball, including:

a ball body, configured to connect with a trailer ball cover;

an installation body, which is fixedly connected to the ball body and configured to connect with an installation base; and an anti-tilt body, where the anti-tilt body is sleeved on an outer circumference of the ball body, and when the ball body is threaded through a coupler and connected to the coupler, one side of the anti-tilt body abuts against the coupler, and the other side of the anti-tilt body abuts against with the ball body.

By adopting the above technical solution, when it is necessary to make the connection between the ball body of the gooseneck ball and the coupler more stable and less prone to tilting, the installation body is provided on the installation base at the rear of the vehicle. The anti-tilt body is sleeved on the outer circumference of the ball body, and one side of the anti-tilt body abuts against the ball body. The ball body is connected to the coupler, and one side of the anti-tilt body abuts against with the ball body and the other side of the anti-tilt body abuts against with the coupler, so that the anti-tilt body is filled between the coupler and the ball body, so that the anti-tilt body limits a swing between the ball body and the coupler, rendering it difficult for the ball body to swing relative to the coupler, so that the ball body is not easily tilted. This improves the existing gooseneck ball in a towing process. The connection between the ball body of the gooseneck ball and the coupler is prone to tilting, which is easy to cause traffic accidents when towing.

In some embodiments of the present disclosure, the anti-tilt body is a cushion pad capable of buffering.

In some embodiments of the present disclosure, a material of the cushion pad includes polyurethane material.

In some embodiments of the present disclosure, the ball body includes a ball portion, and the anti-tilt body abuts against the ball portion.

In some embodiments of the present disclosure, the ball body includes a ball portion and a reinforcement portion, the reinforcement portion is connected to an outer peripheral surface of the ball portion, and the anti-tilt body abuts against the reinforcement portion.

In some embodiments of the present disclosure, the reinforcing part includes a reinforcement top piece, the reinforcement top piece is connected to the ball portion, and the anti-tilt body abuts against the reinforcement top piece.

In some embodiments of the present disclosure, the reinforcement portion further includes at least one reinforcement rib, and the reinforcement rib is fixedly provided on the ball portion and is extended to the installation body, and the reinforcement rib is connected to the reinforcement top piece.

In some embodiments of the present disclosure, the reinforcement portion further includes a reinforcement bottom piece, the reinforcement bottom piece is provided between the installation body and the reinforcement rib, the reinforcement bottom piece is connected to the ball portion, and one side of the reinforcement bottom piece is connected to the reinforcement rib.

In some embodiments of the present disclosure, the reinforcement portion further includes one or more reinforcement piece, and the reinforcement piece is connected to the ball portion;

the reinforcement piece is fixedly connected to the reinforcing rib.

An anti-tilt method for the anti-tilt gooseneck ball, including the following steps:

(a) installing the installation body onto the installation base at a rear of a vehicle;

(b) placing the anti-tilt body on the outer circumference of the ball body and ensure that one side of the anti-tilt body abuts against the ball body;

(c) connecting the ball body to the coupler, one side of the anti-tilt body abuts against the ball body and the other side of the anti-tilt body abuts against the coupler, so that the anti-tilt body is filled between the coupler and the ball body to prevent the ball body from tilting.

In summary, this application includes at least one beneficial technical effect as follows.

When it is necessary to make the connection between the ball body of the gooseneck ball and the coupler more stable and less prone to tilting, the installation body is provided on the installation base at the rear of the vehicle. The anti-tilt body is sleeved on the outer circumference of the ball body, and one side of the anti-tilt body abuts against the ball body. The ball body is connected to the coupler, and one side of the anti-tilt body abuts against with the ball body and the other side of the anti-tilt body abuts against with the coupler, so that the anti-tilt body is filled between the coupler and the ball body, so that the anti-tilt body limits a swing between the ball body and the coupler, rendering it difficult for the ball body to swing relative to the coupler, so that the ball body is not easily tilted. This improves the existing gooseneck ball in a towing process. The connection between the ball body of the gooseneck ball and the coupler is prone to tilting, which is easy to cause traffic accidents when towing.

Numeral reference: 1—ball portion; 11—ball segment; 12—arc-shaped platform segment; 13—cylindrical segment; 2—installation part; 21—connection section; 22—main body section; 221—connection hole; 222—central hole; 23—first column section; 24—second column section; 241—locking hole; 25—third column section; 3—reinforcement portion; 31—reinforcement rib; 32—reinforcement top piece; 33—reinforcement connection piece; 34—reinforcement bottom piece; 341—weight reduction slot; 35—reinforcement piece; 4—locking portion; 41—locking rod; 411—locking segment; 412—rod body section; 413—clamping section; 414—cylindrical segment; 415—bottom section; 42—locking ball; 43—locking spring; 10—ball body; 20—installation body; 30—anti-tilt body; 100—gooseneck ball; 200—coupler.

DESCRIPTION OF EMBODIMENTS

Figure 1:
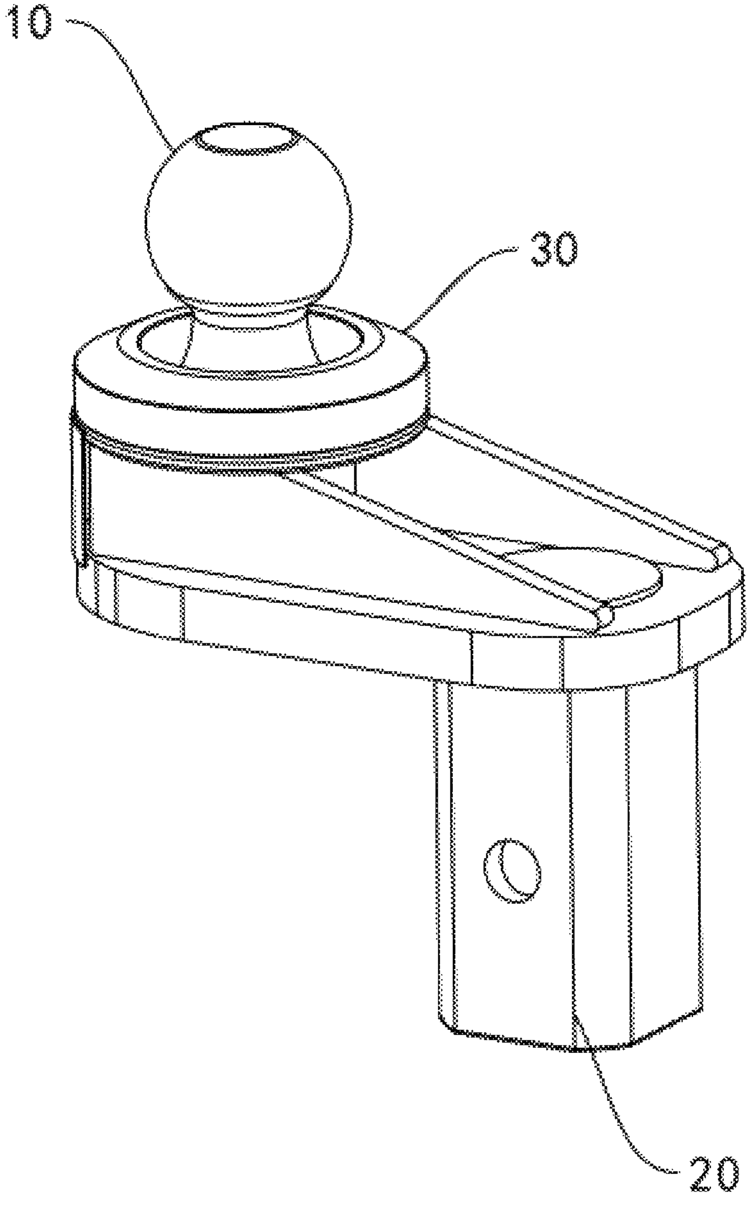
FIG. 1 is a first schematic diagram of an overall structure of an embodiment.
Figure 2:
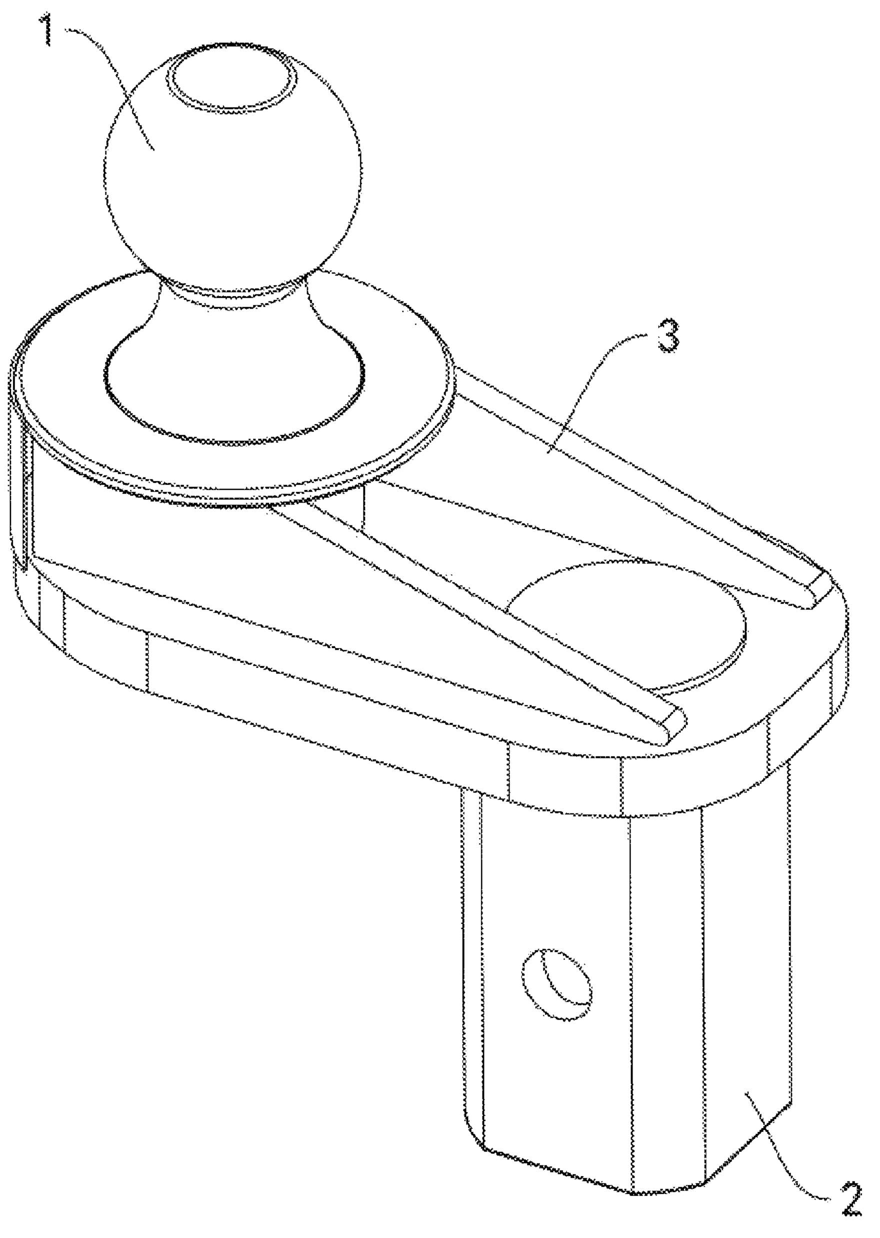
FIG. 2 is a second schematic diagram of an overall structure of an embodiment.
Figure 3:
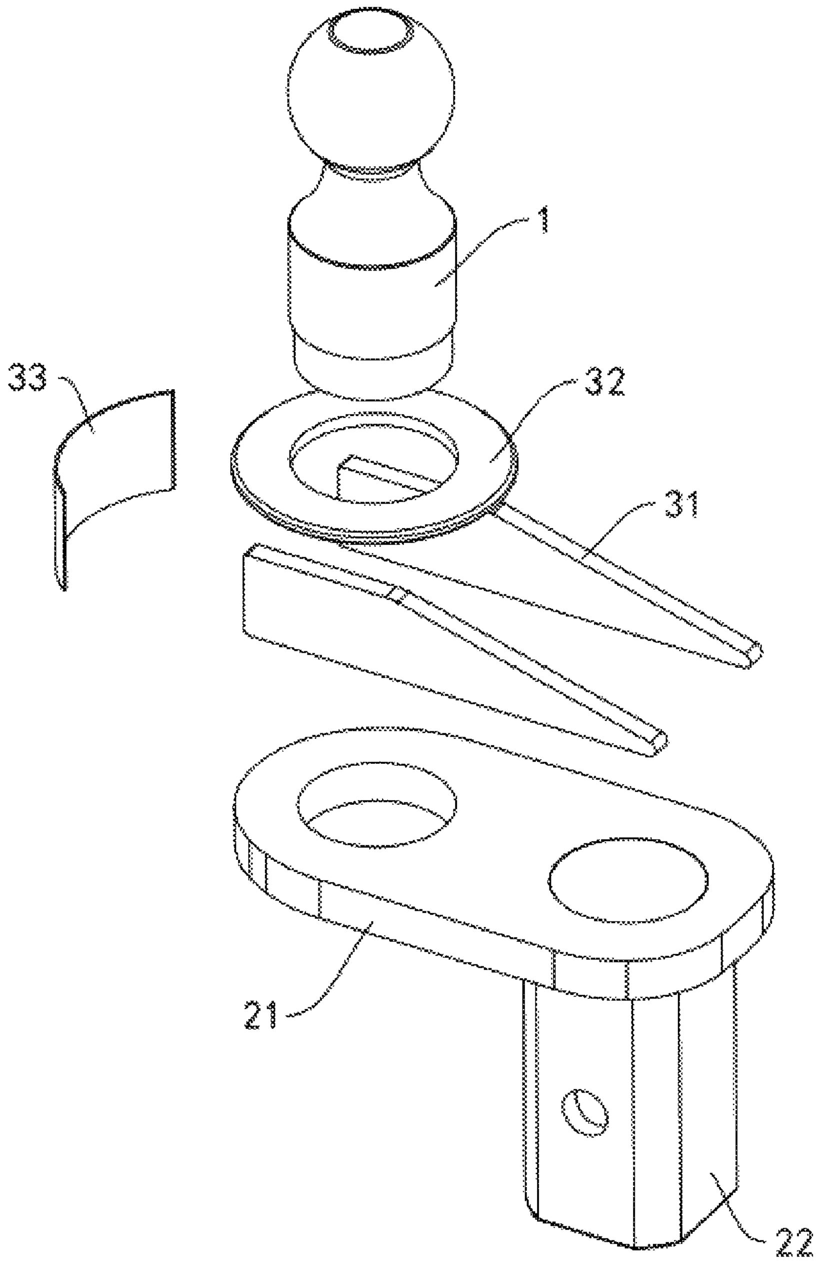
FIG. 3 is a schematic diagram of an explosive structure in an embodiment.
Figure 4:
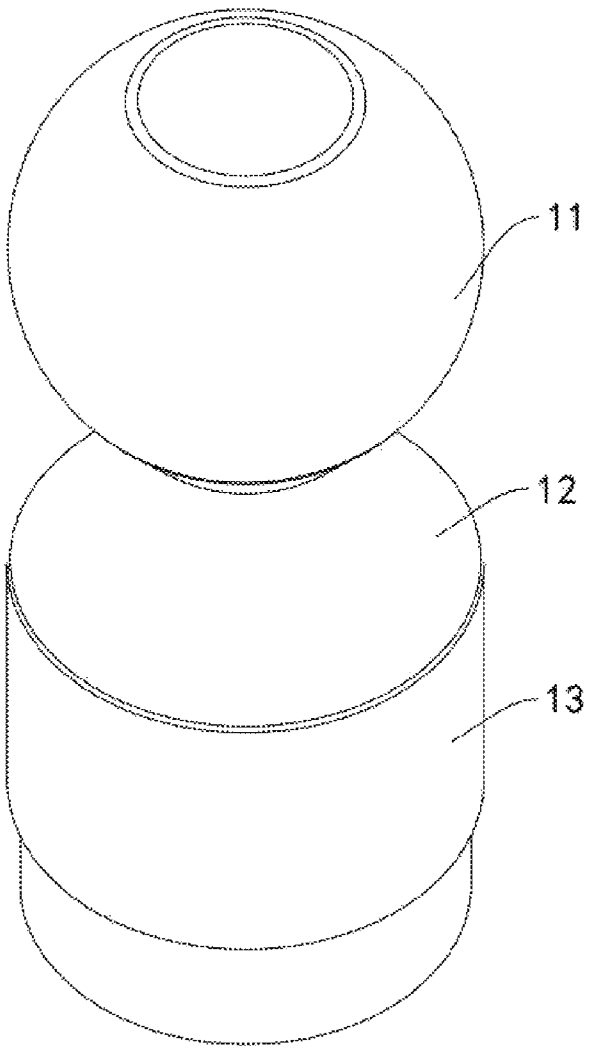
FIG. 4 is a schematic structural diagram of a ball body in an embodiment.
Figure 5:
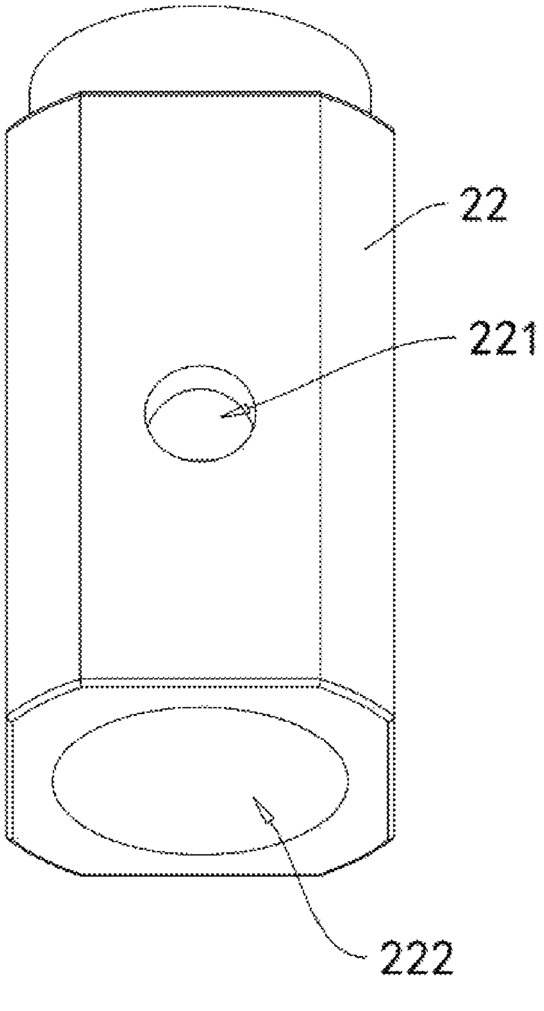
FIG. 5 is a schematic structural diagram of a main body segment in an embodiment.
Figure 6:
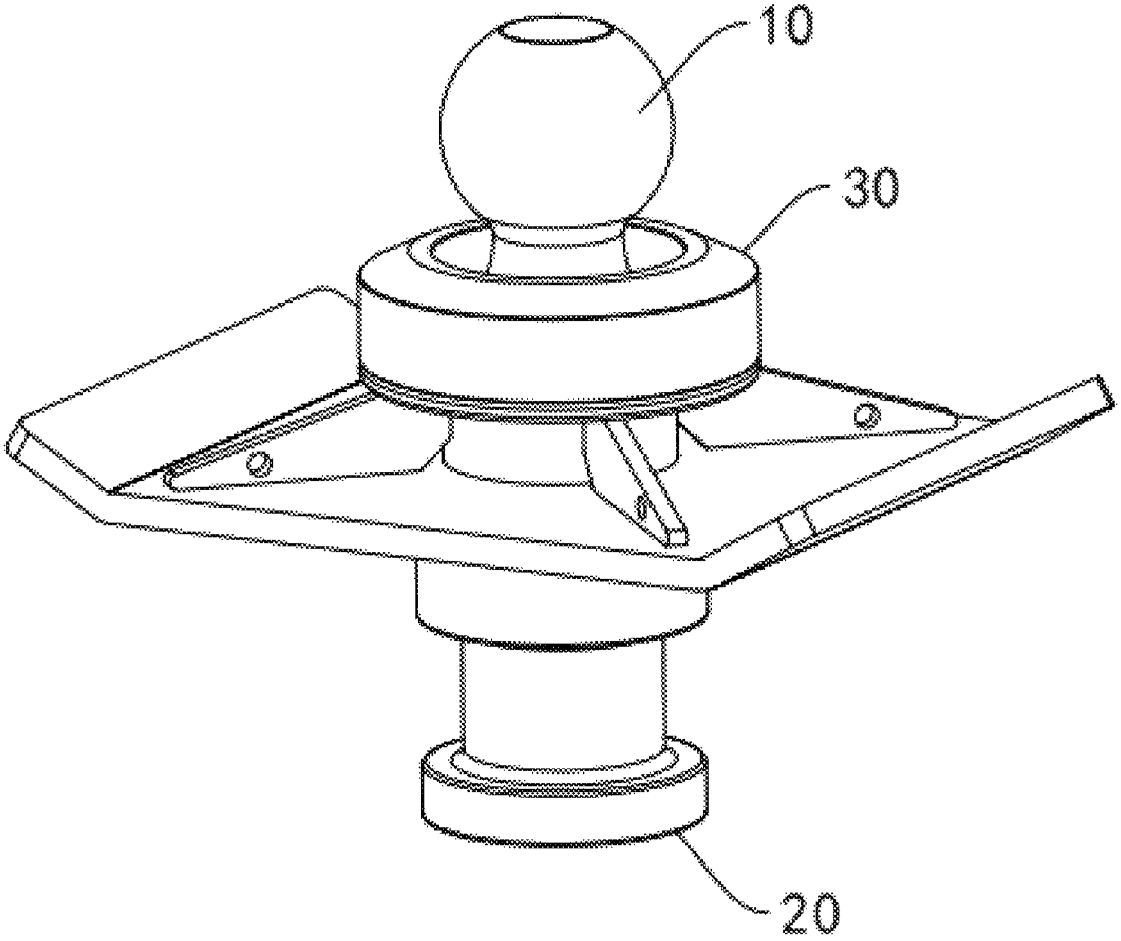
FIG. 6 is a first schematic diagram of an overall structure of another embodiment.
Figure 7:
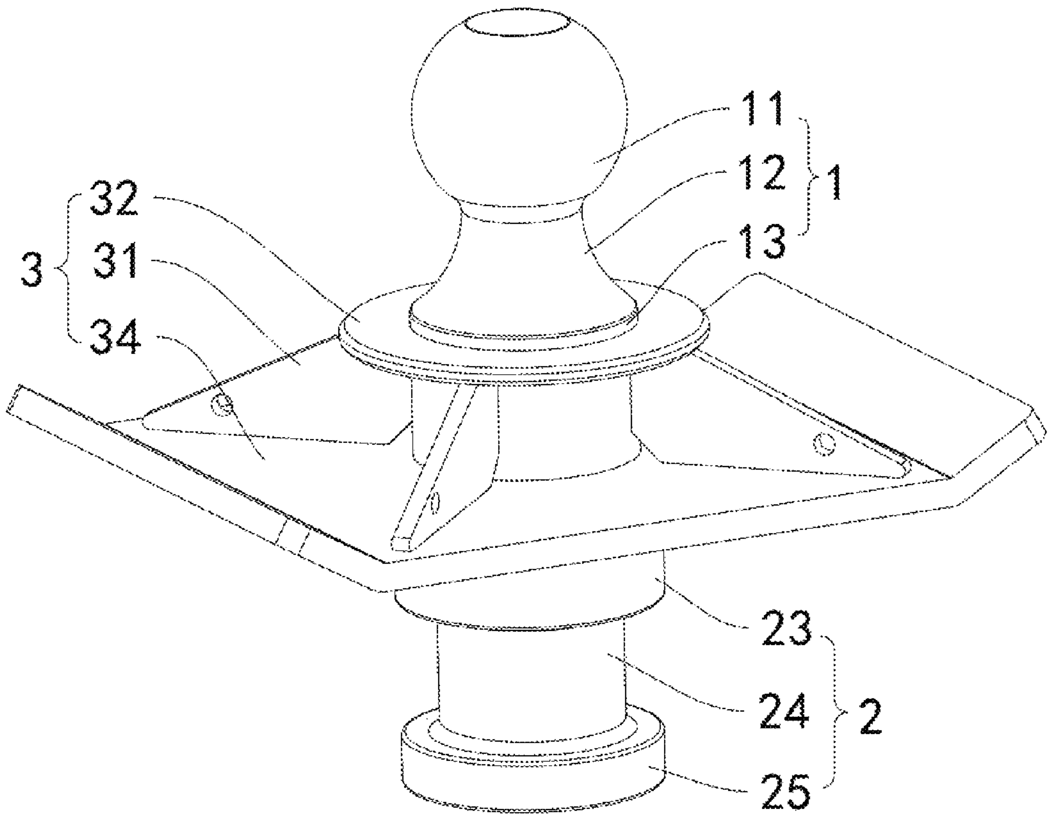
FIG. 7 is a second schematic diagram of an overall structure of another embodiment.
Figure 8:
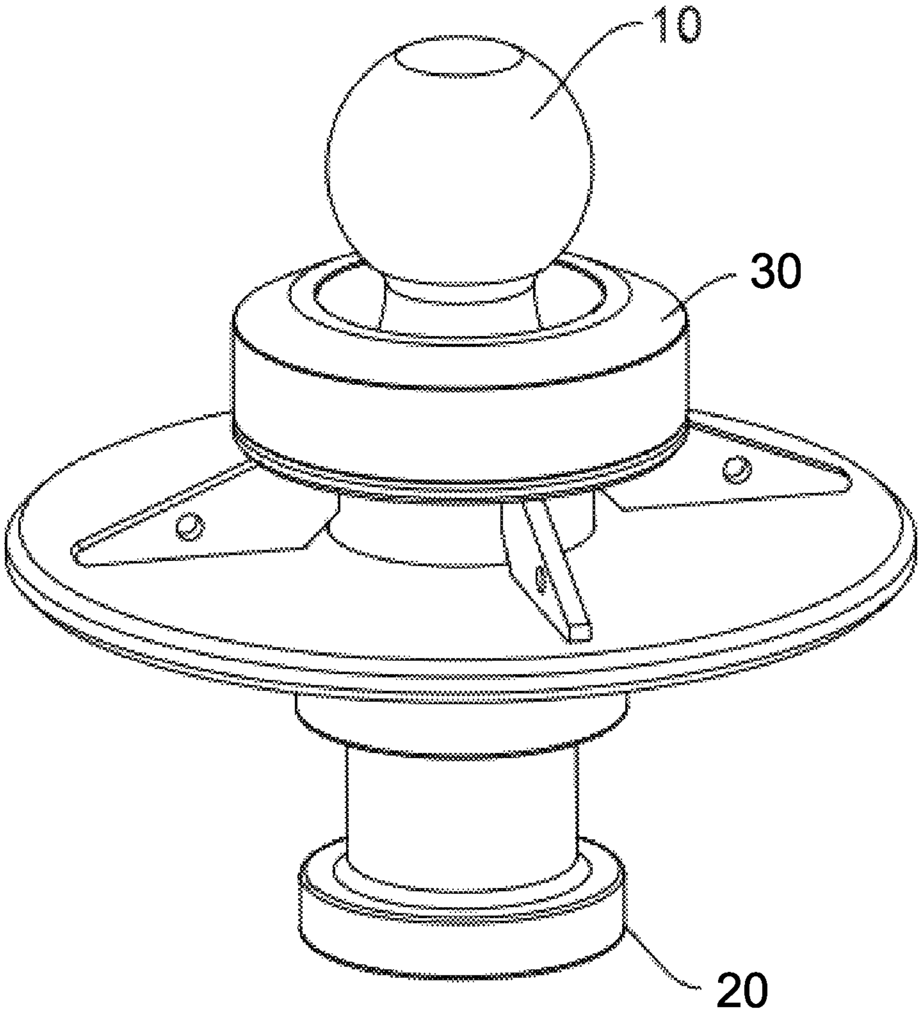
FIG. 8 is a third schematic diagram of an overall structure of another embodiment.
Figure 9:
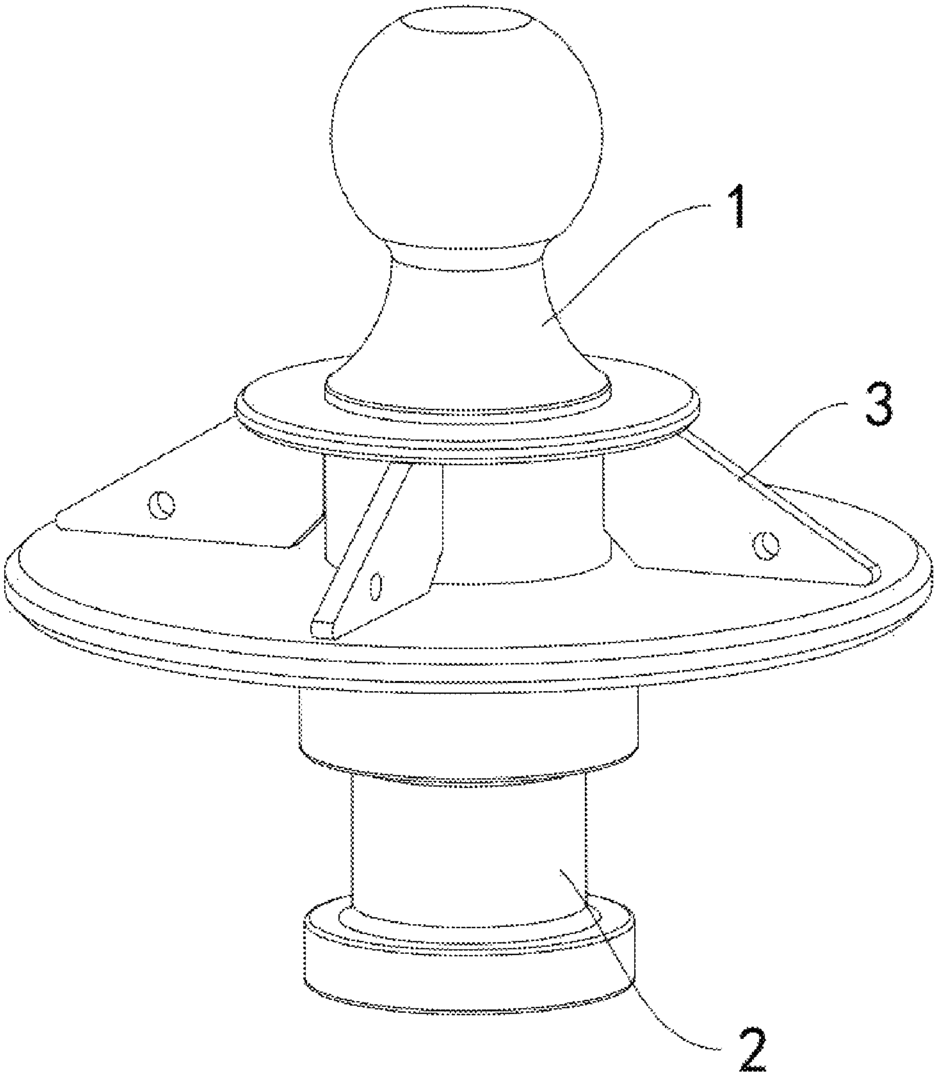
FIG. 9 is a fourth schematic diagram of an overall structure of another embodiment.
Figure 10:
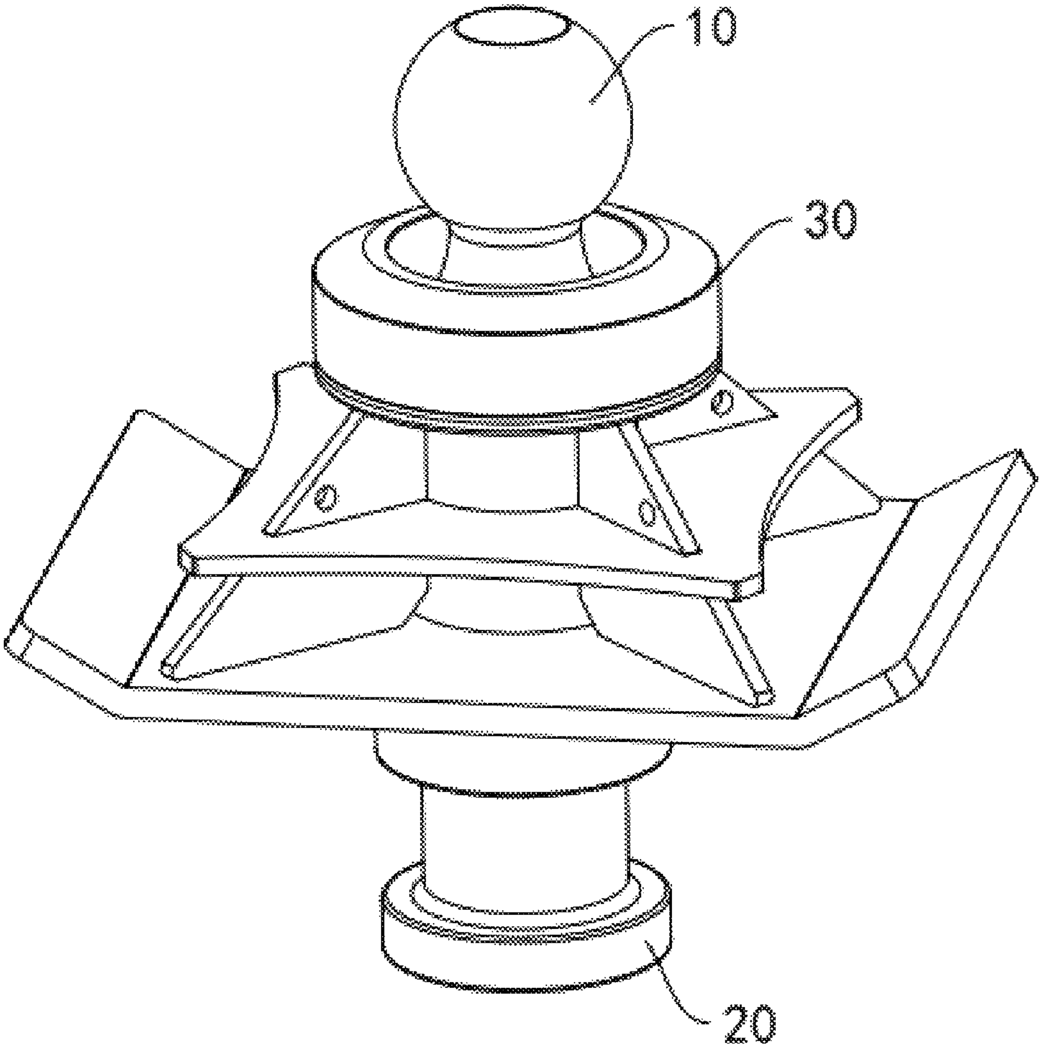
FIG. 10 is a fifth schematic diagram of an overall structure of another embodiment.
Figure 11:
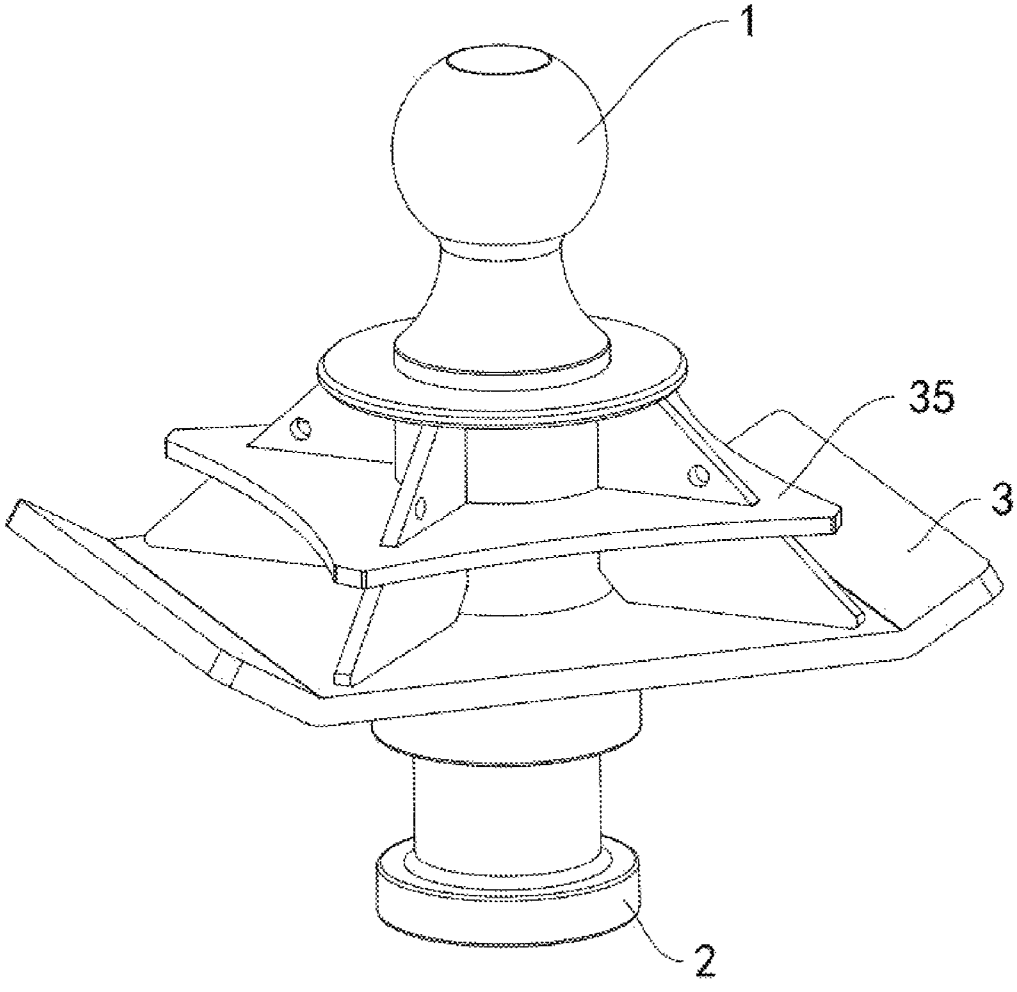
FIG. 11 is a sixth schematic diagram of an overall structure of another embodiment.
Figure 12:
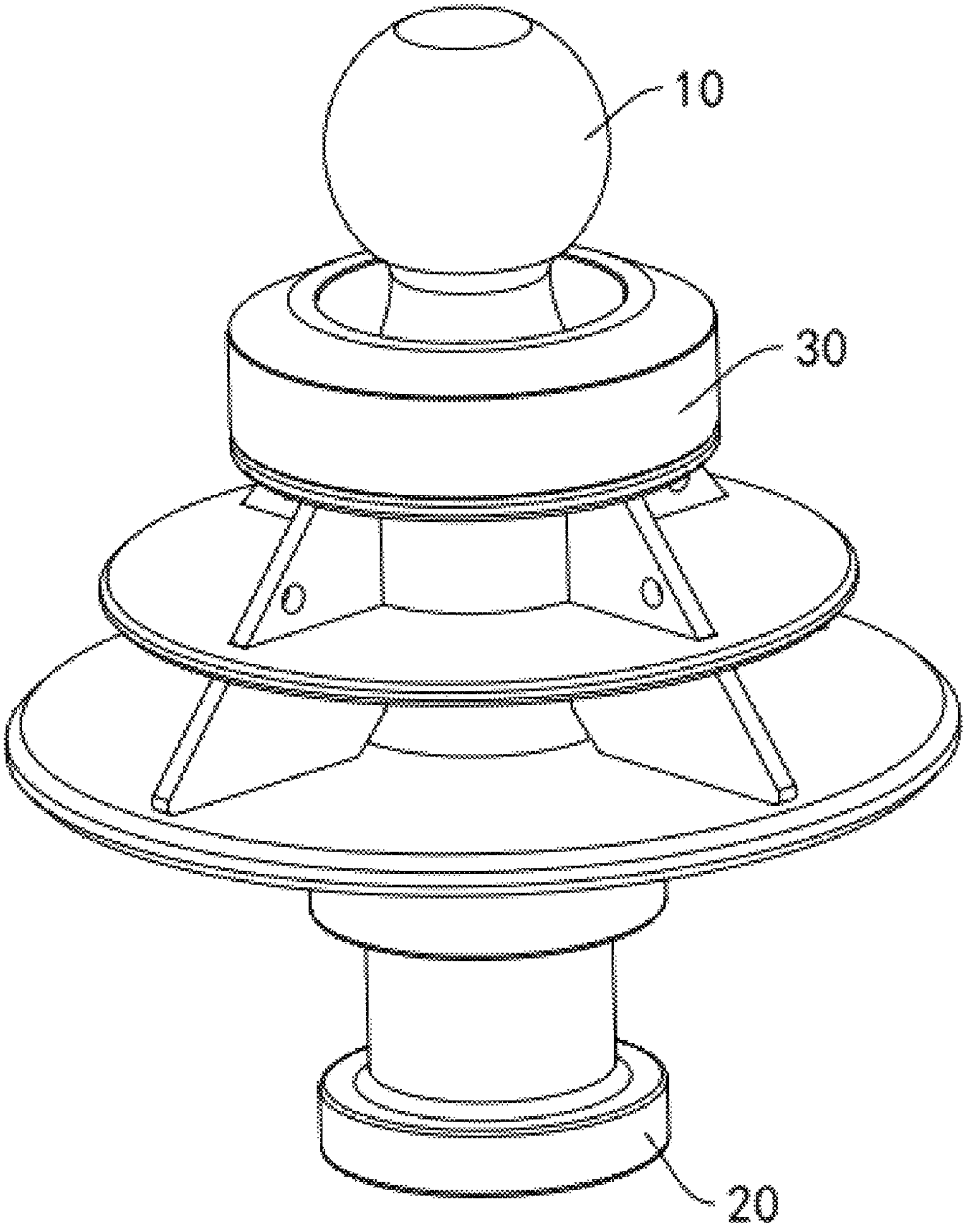
FIG. 12 is a seventh schematic diagram of an overall structure of another embodiment.
Figure 13:
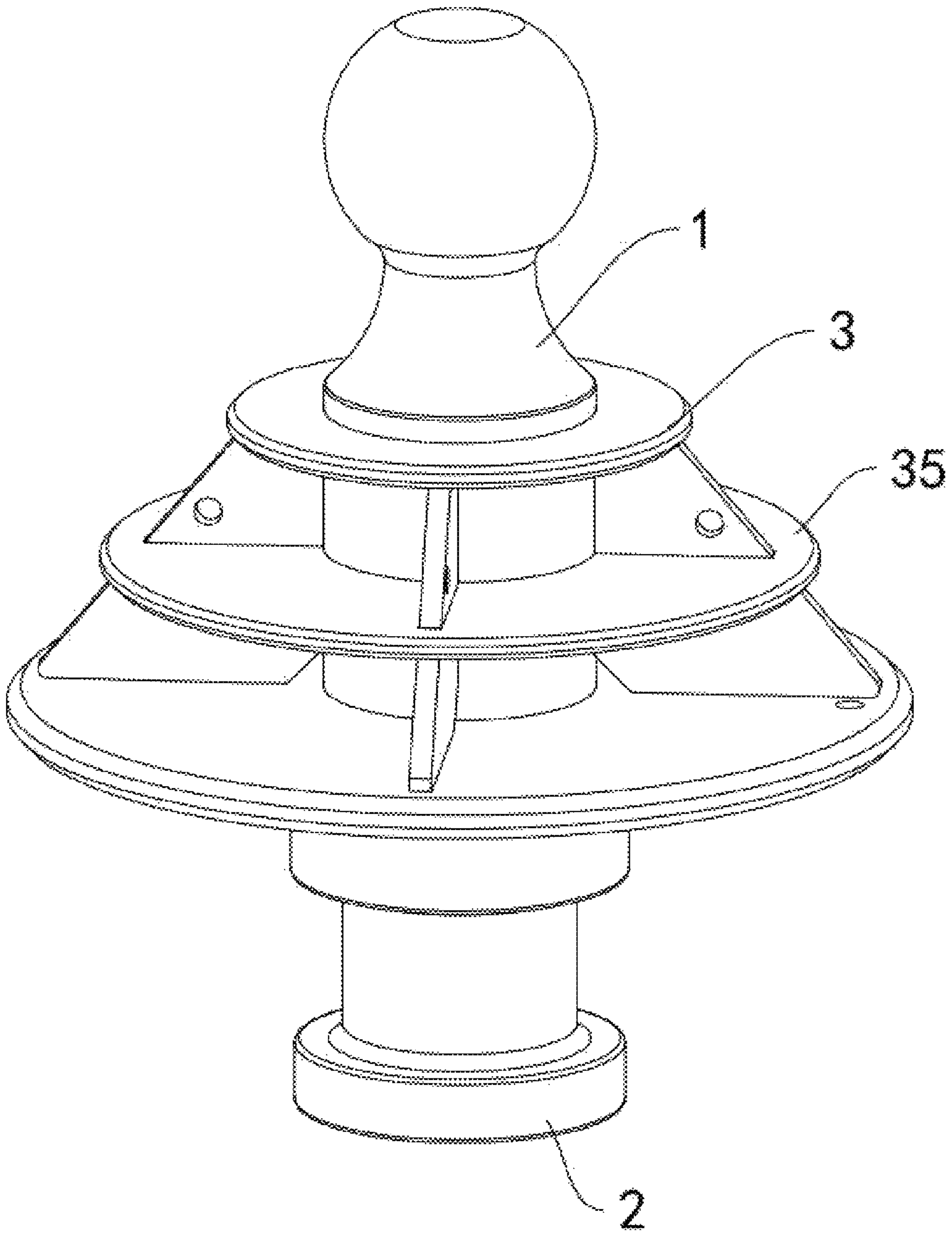
FIG. 13 is an eighth schematic diagram of an overall structure of another embodiment.
Figure 14:
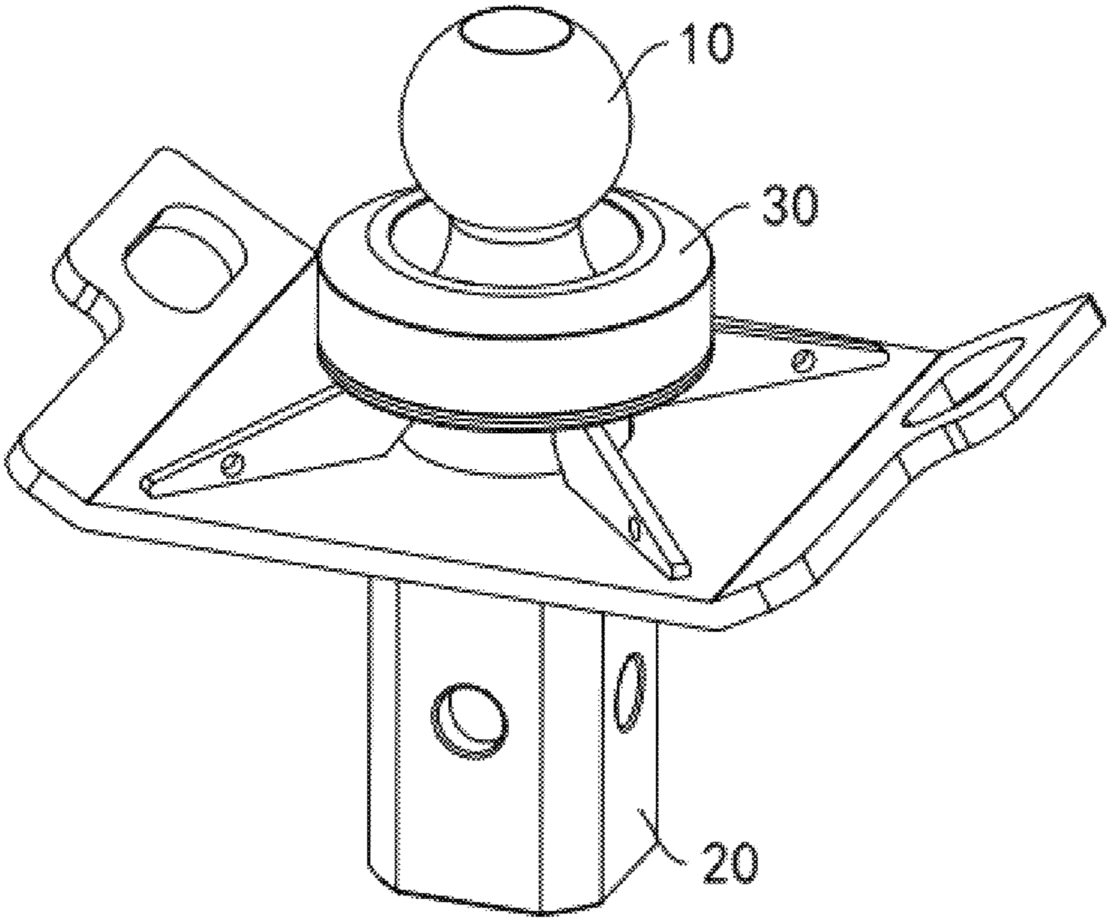
FIG. 14 is a first schematic diagram of an overall structure of a still embodiment.
Figure 15:
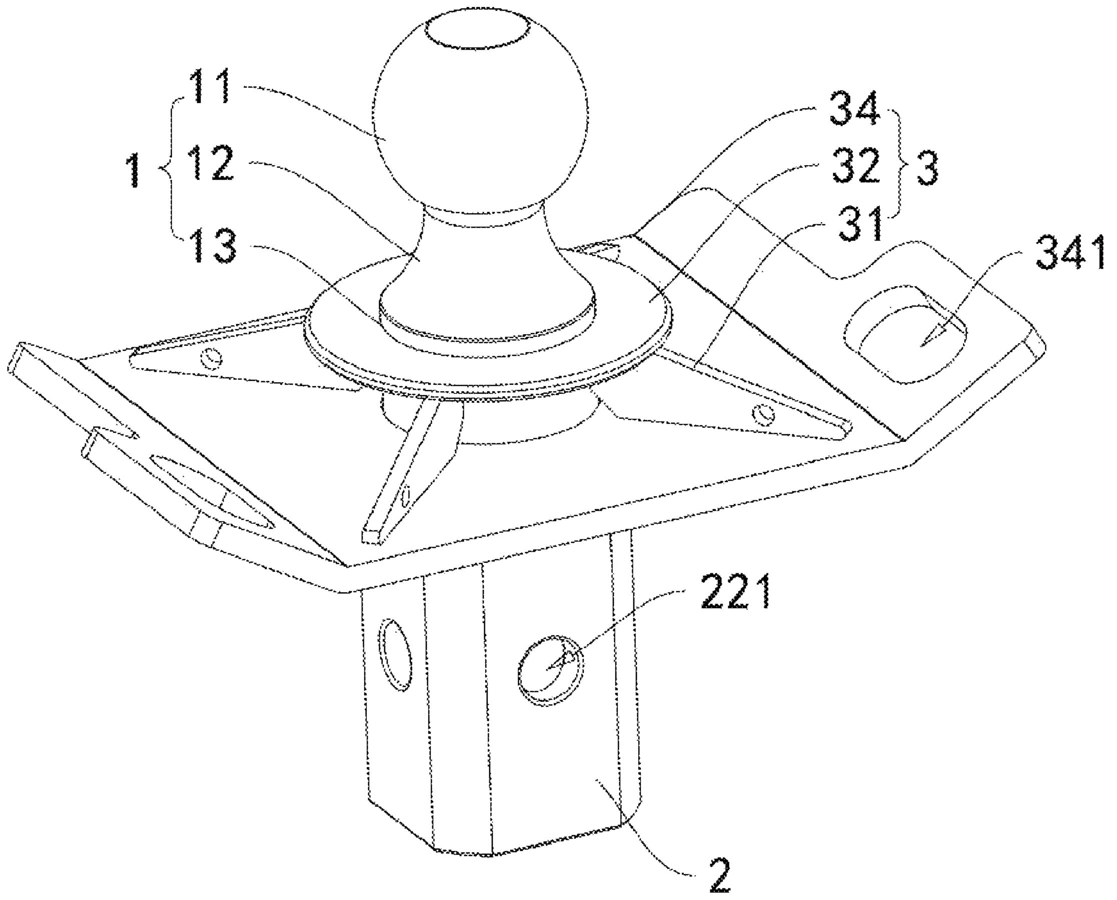
FIG. 15 is a second schematic diagram of an overall structure of a still embodiment.
Figure 16:
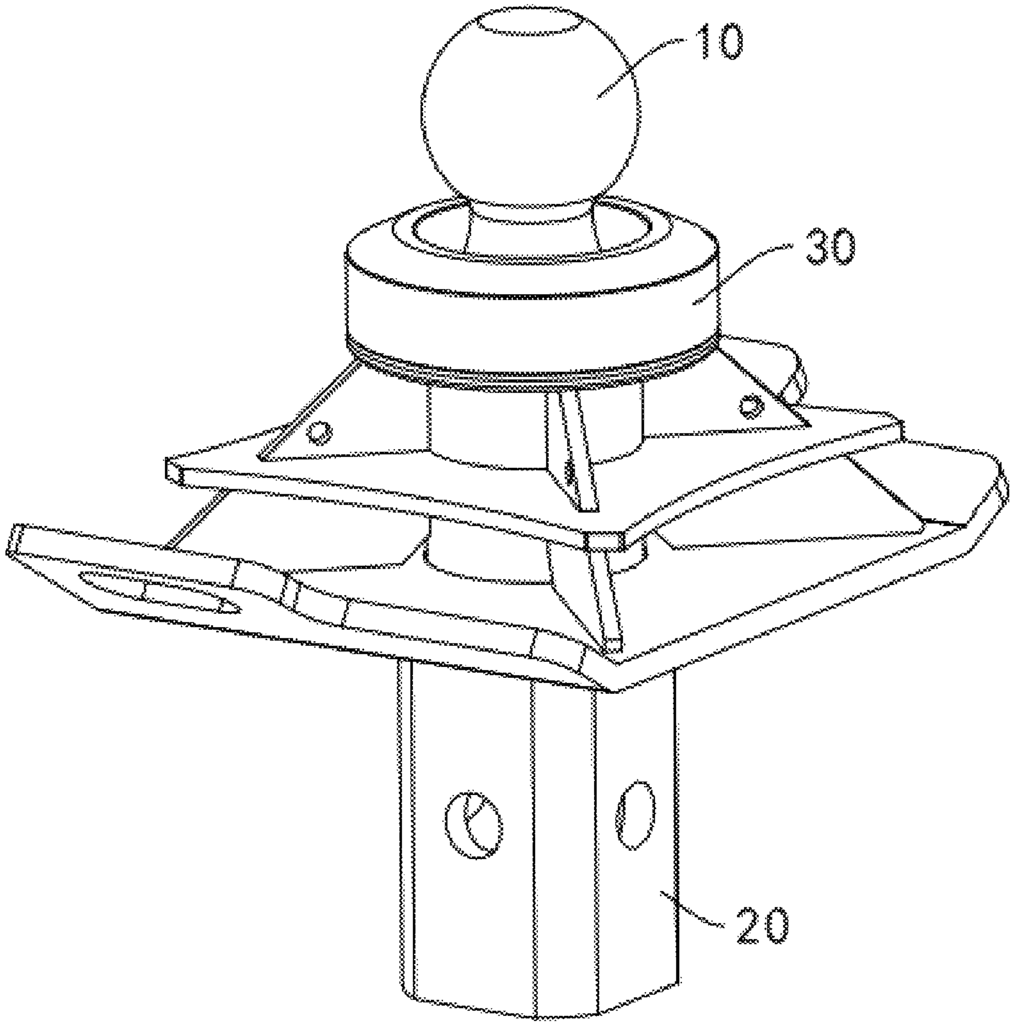
FIG. 16 is a third schematic diagram of an overall structure of a still embodiment.
Figure 17:
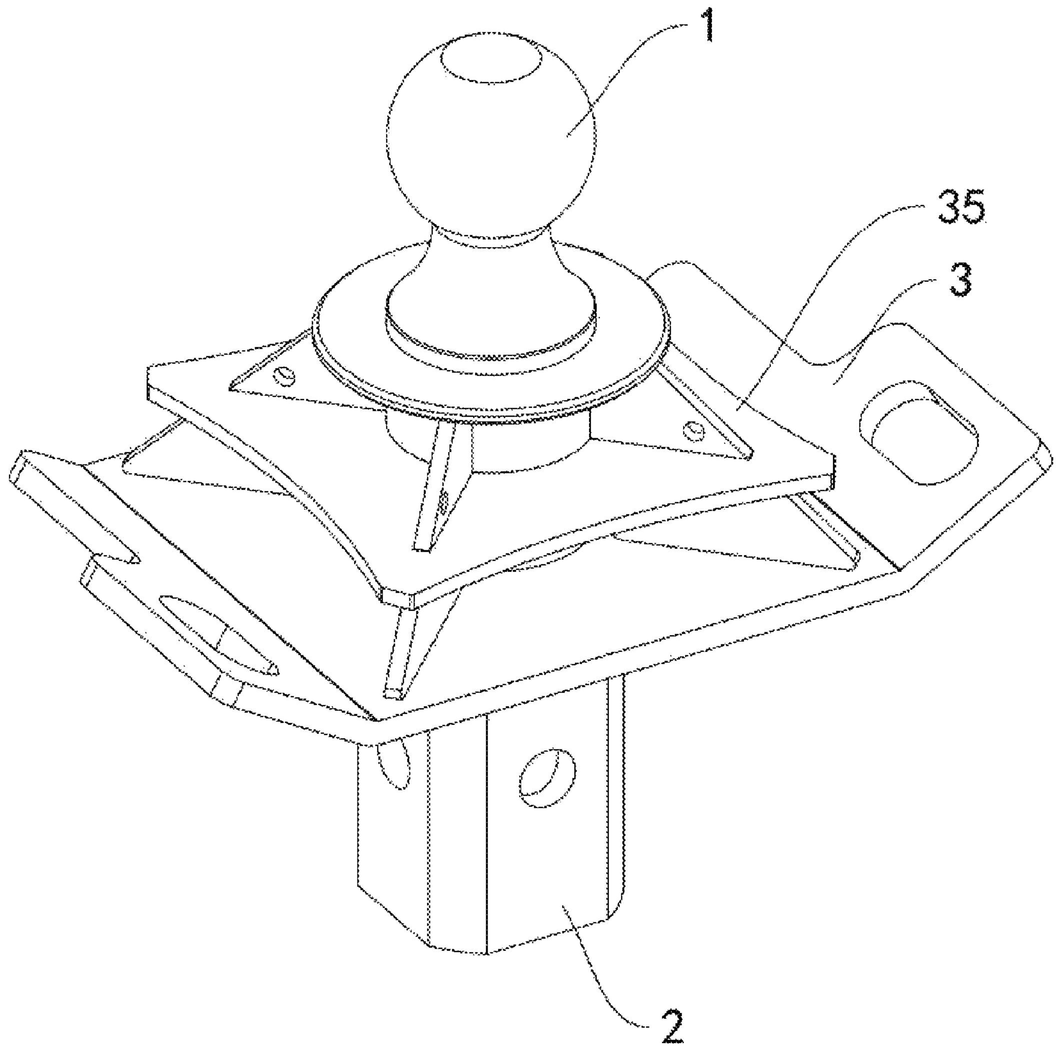
FIG. 17 is a fourth schematic diagram of an overall structure of a still embodiment.
Figure 18:
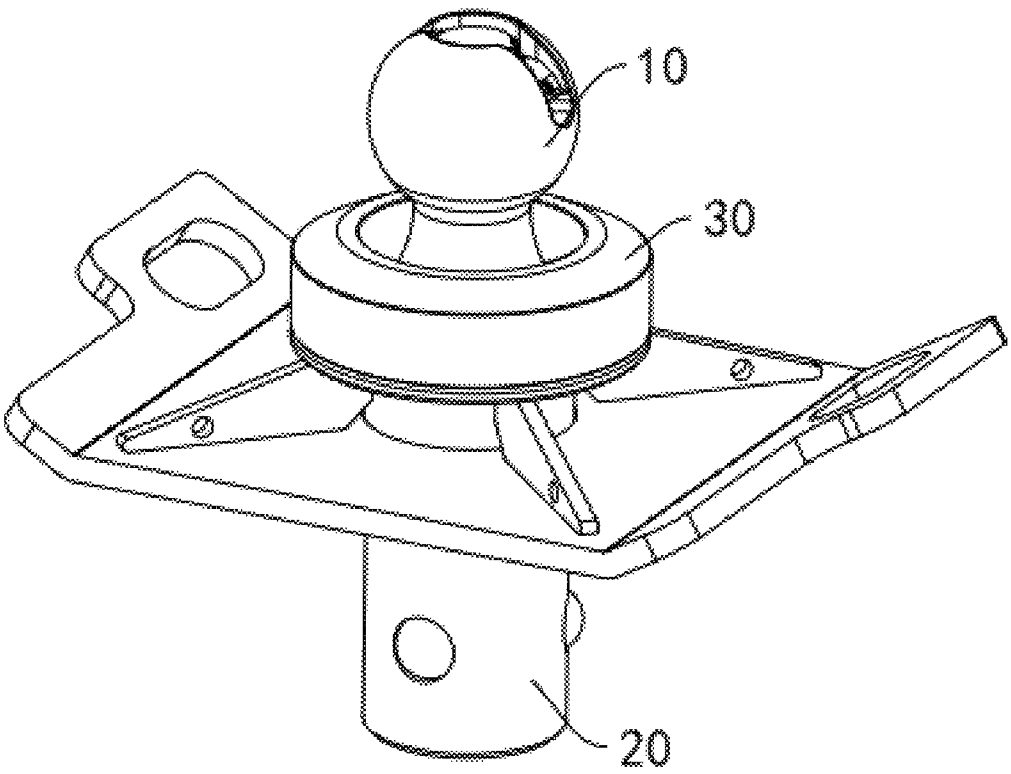
FIG. 18 is a first schematic diagram of an overall structure of a yet one embodiment.
Figure 19:
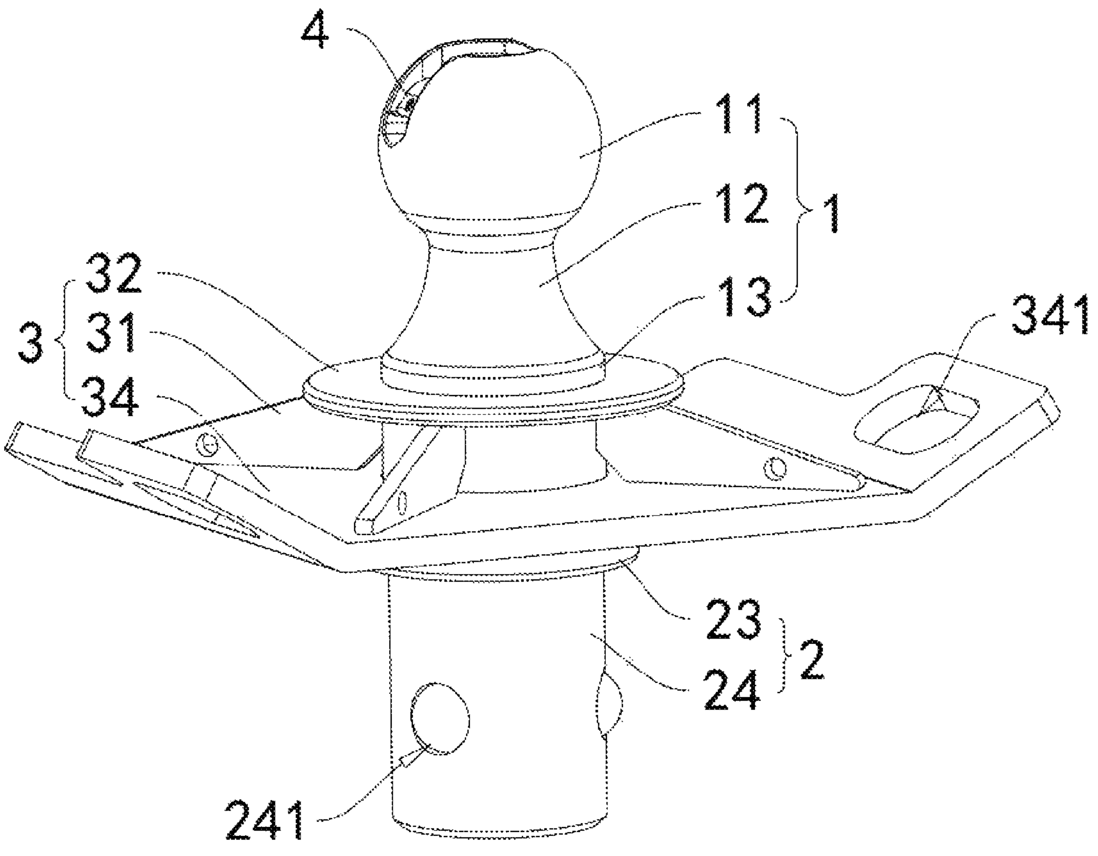
FIG. 19 is a second schematic diagram of an overall structure of a yet one embodiment.
Figure 20:
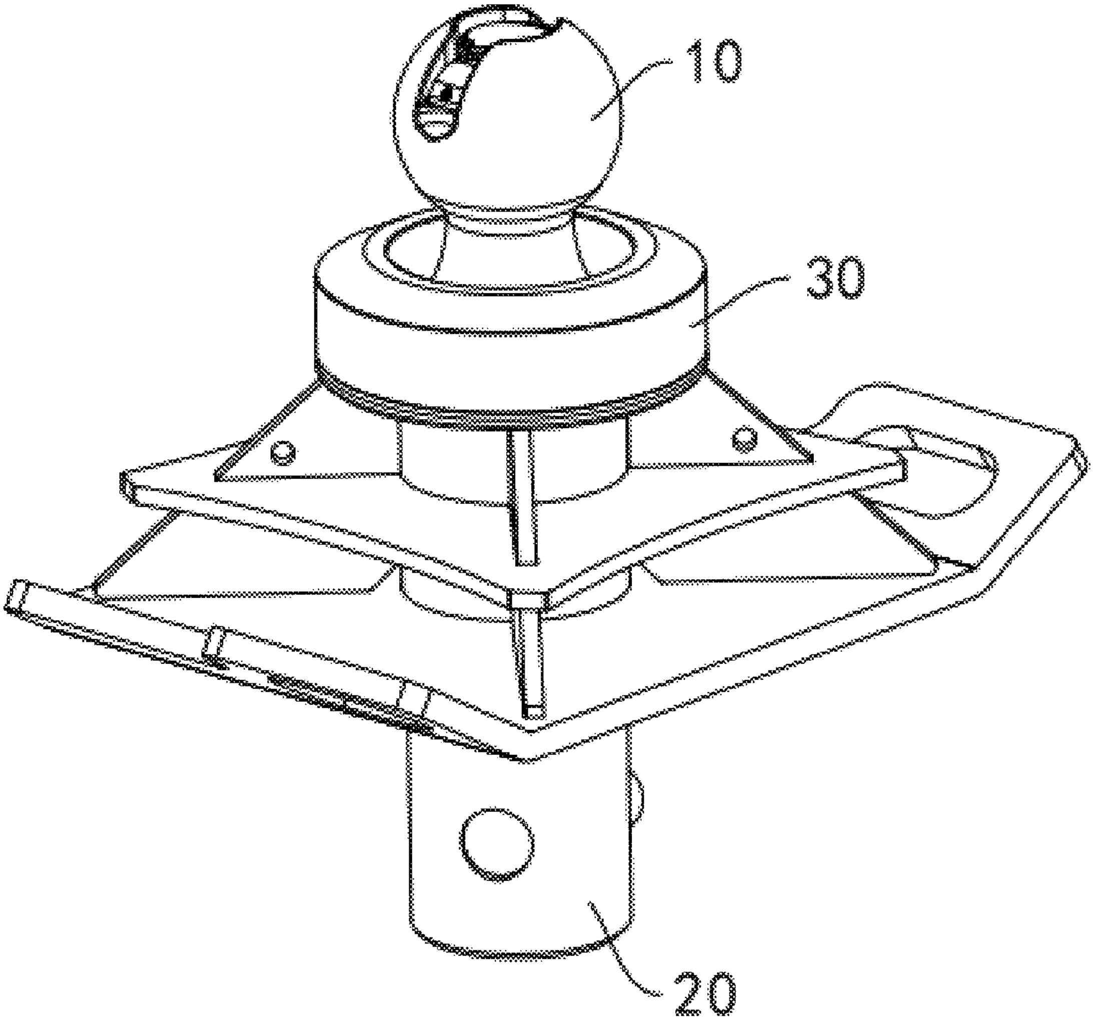
FIG. 20 is a third schematic diagram of an overall structure of a yet one embodiment.
Figure 21:
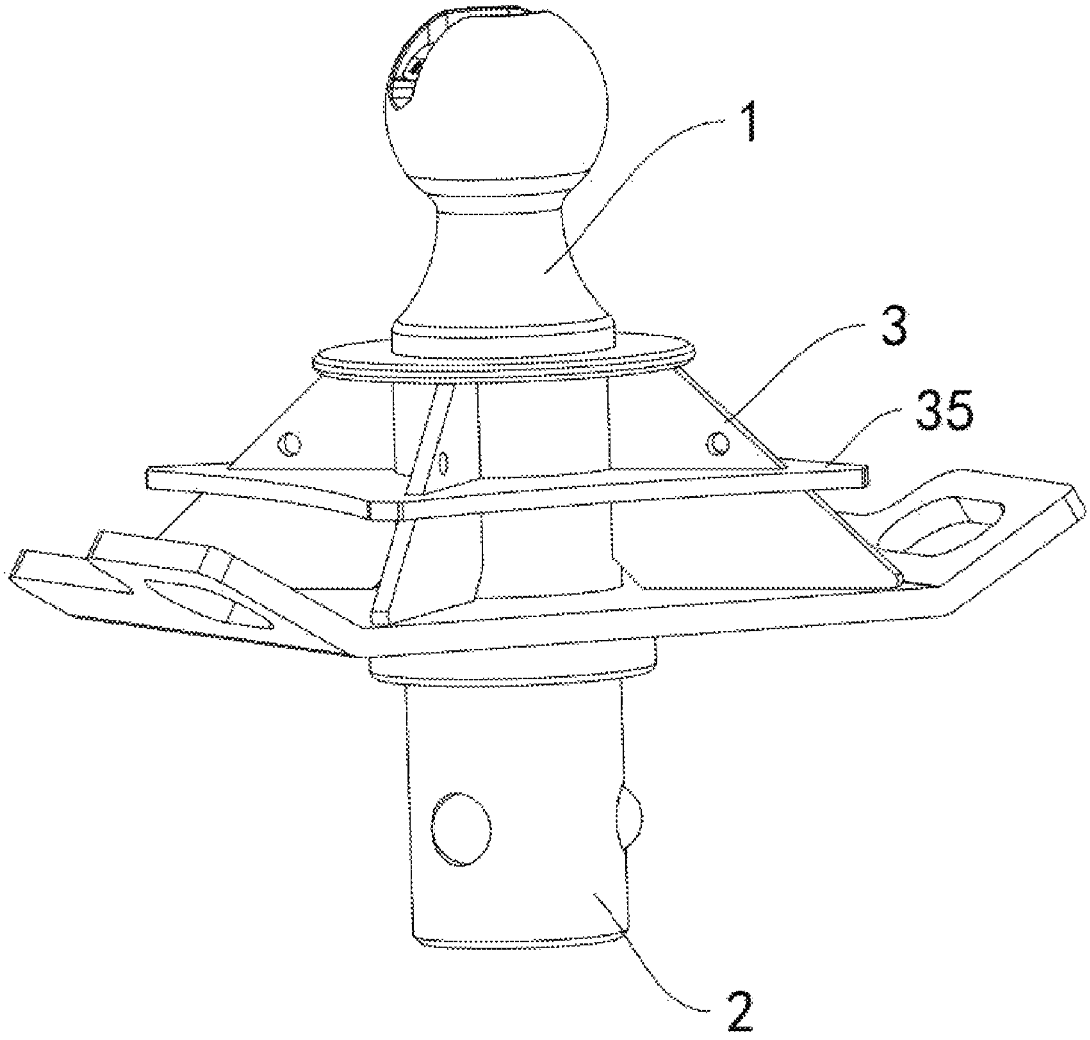
FIG. 21 is a fourth schematic diagram of an overall structure of a yet one embodiment.
Figure 22:
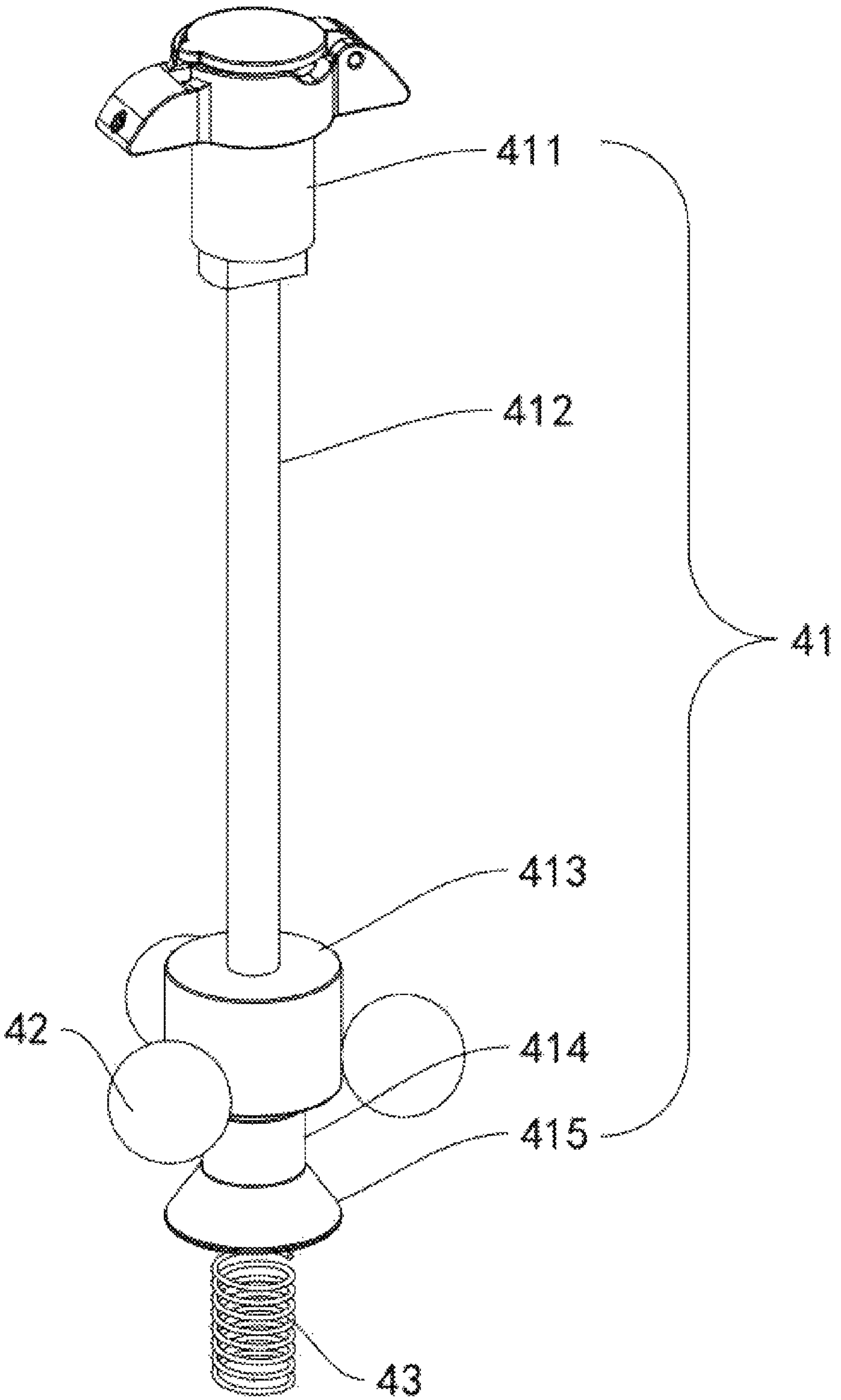
FIG. 22 is a schematic structural diagram of a locking part of a yet one embodiment.
Figure 23:
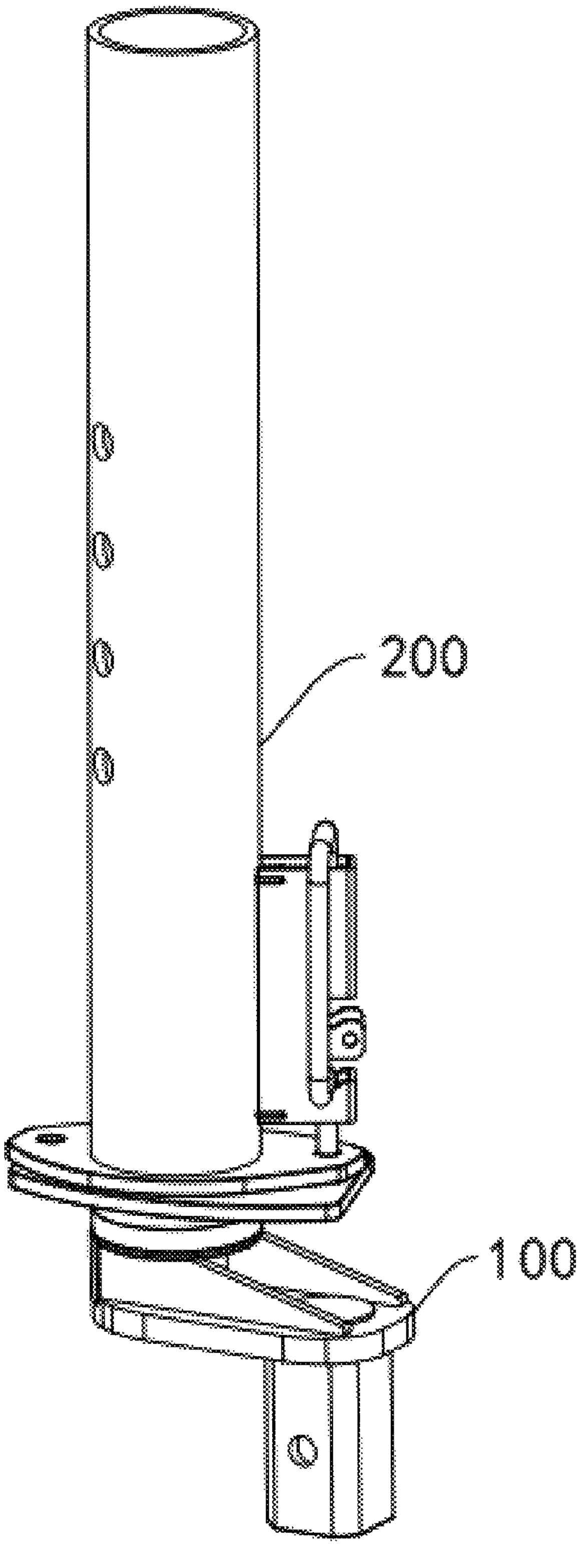
FIG. 23 is a first schematic diagram of a connection between a gooseneck ball and a coupler.
Figure 24:
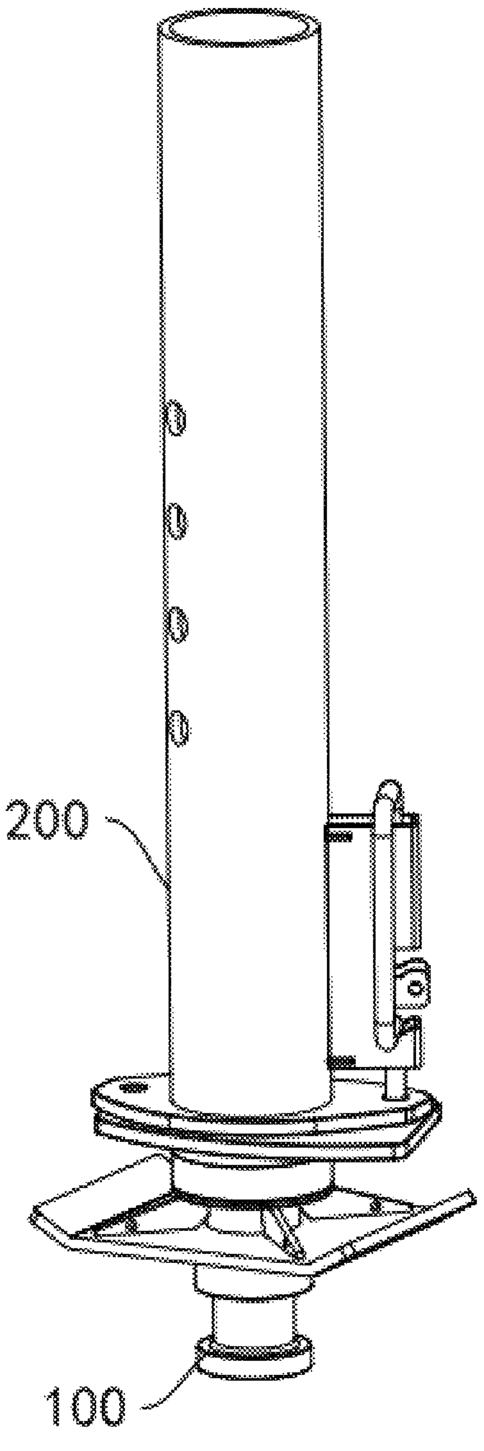
FIG. 24 is a second schematic diagram of the connection between the gooseneck ball and the coupler.
Figure 25:
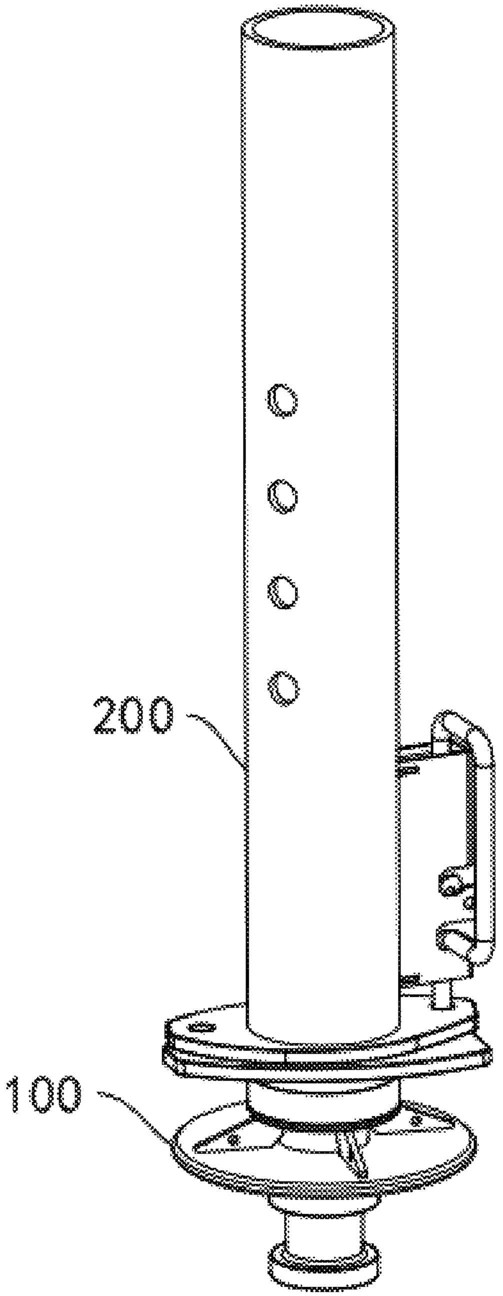
FIG. 25 is a third schematic diagram of the connection between the gooseneck ball and the coupler.
Figure 26:
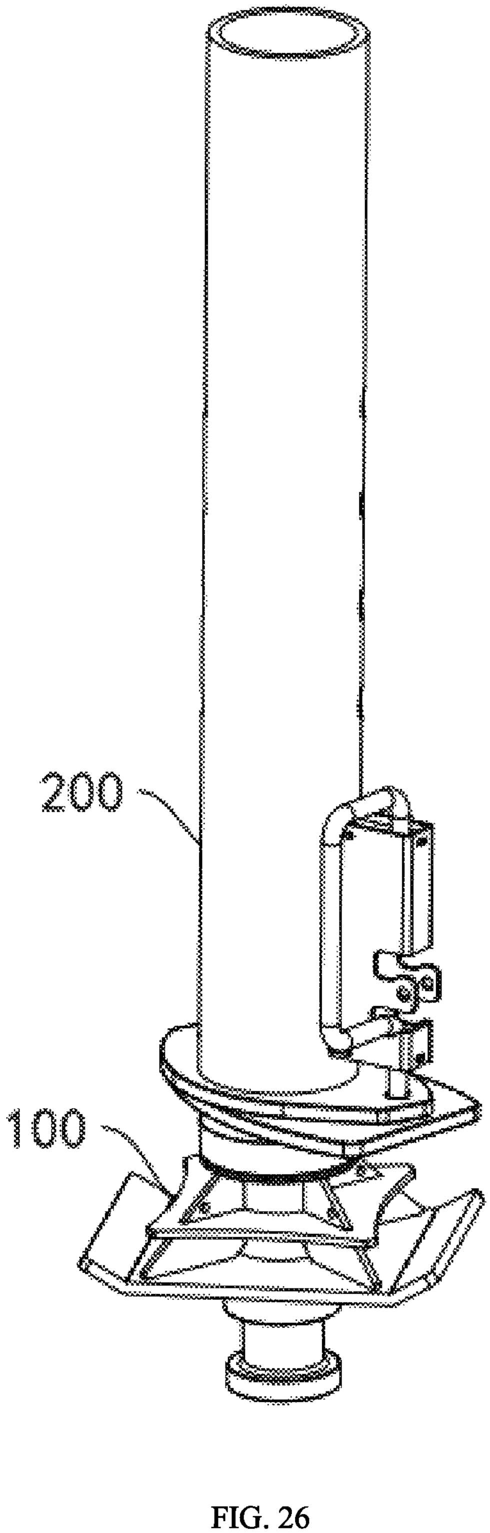
FIG. 26 is a fourth schematic diagram of the connection between the gooseneck ball and the coupler.
Figure 27:
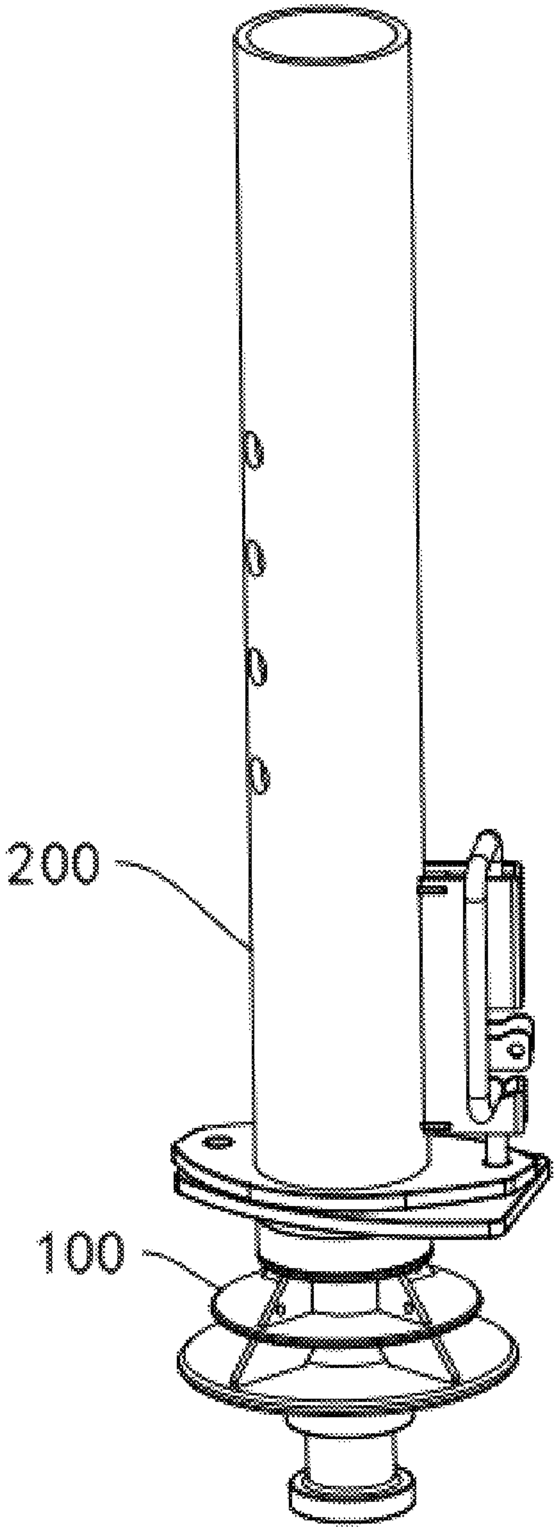
FIG. 27 is a fifth schematic diagram of the connection between the gooseneck ball and the coupler.
Figure 28:
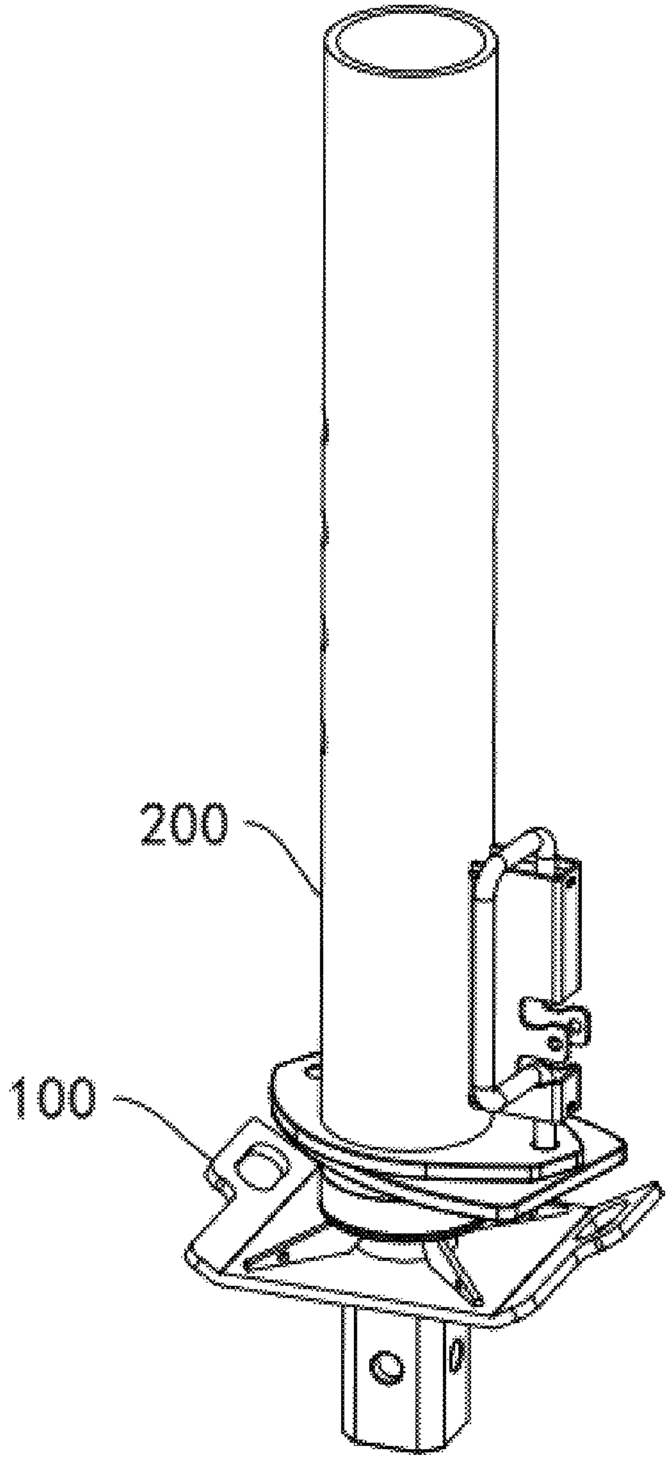
FIG. 28 is a sixth schematic diagram of the connection between the gooseneck ball and the coupler.
Figure 29:
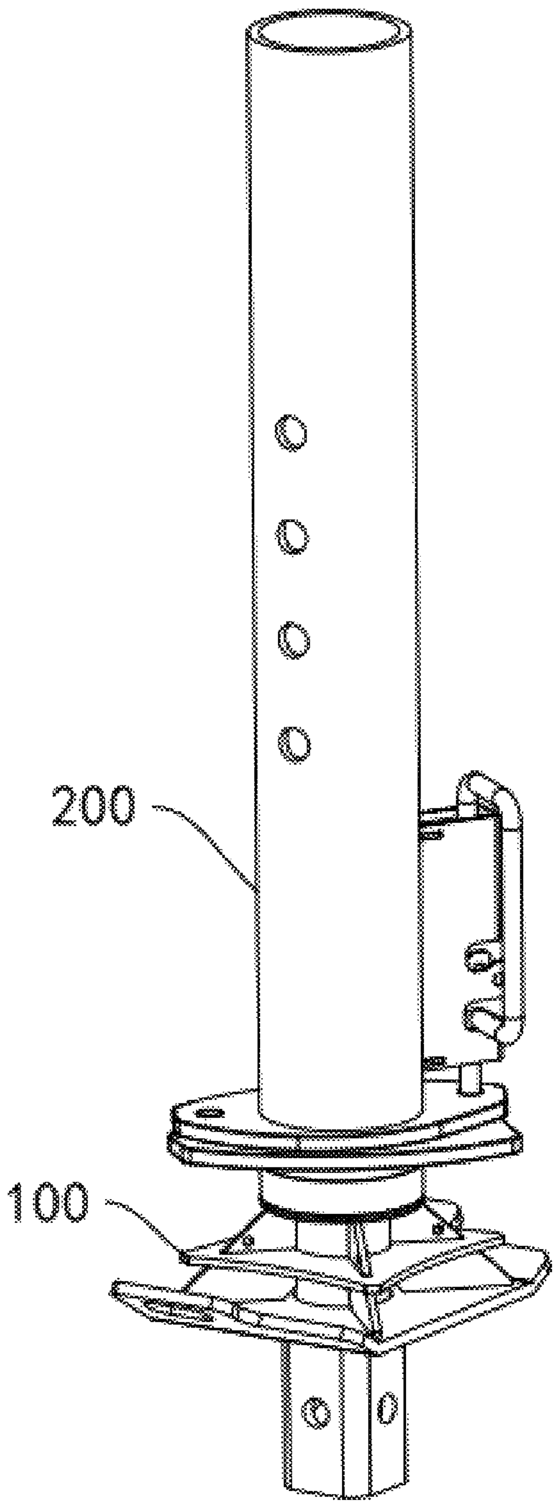
FIG. 29 is a seventh schematic diagram of the connection between the gooseneck in ball and the coupler.
Figure 30:
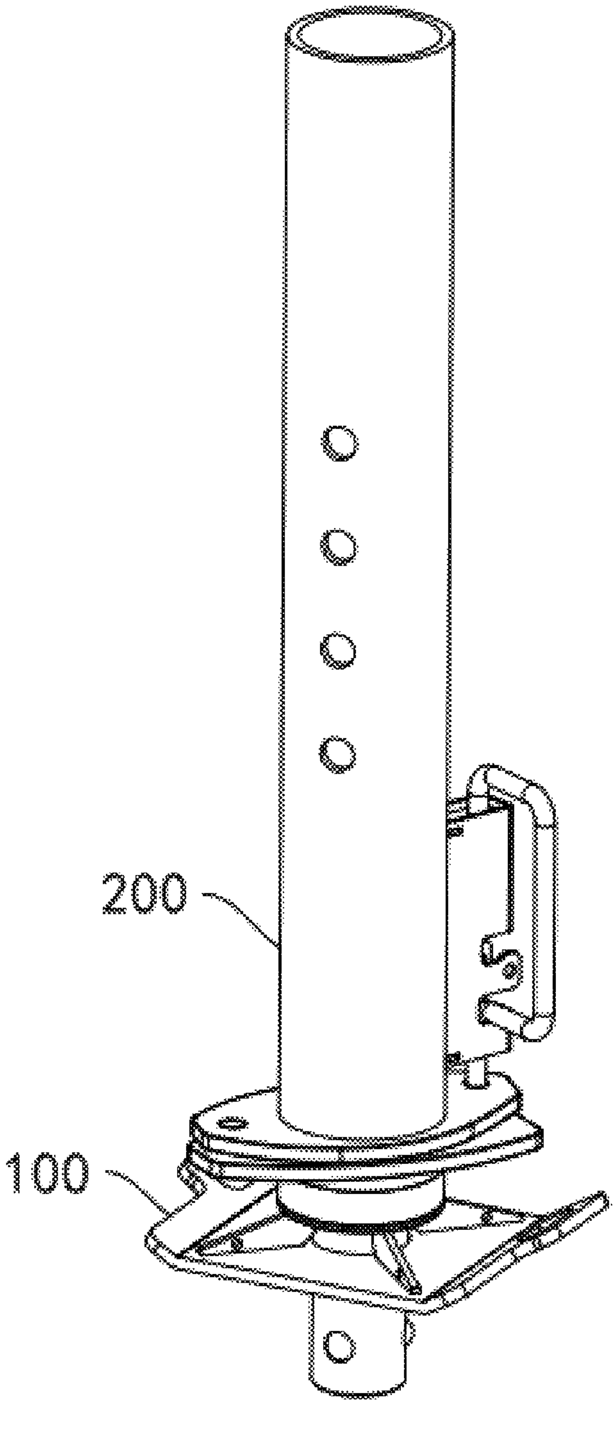
FIG. 30 is an eighth schematic diagram of the connection between the gooseneck ball and the coupler.
Figure 31:
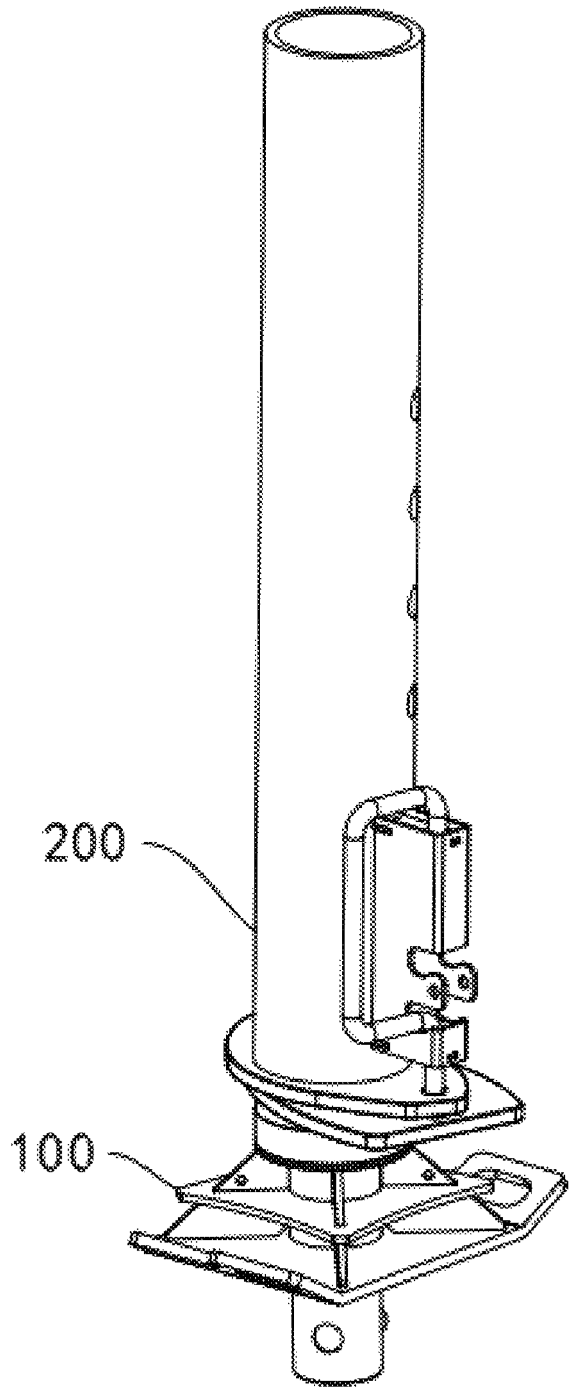
FIG. 31 is a ninth schematic diagram of the connection between the gooseneck ball and the coupler.

Further detailed explanation of the present application will be provided in combination with FIGS. 1-22.

This application discloses an anti-tilt gooseneck ball and an anti-tilt method.

Referring to FIGS. 1 to 5, the anti-tilt gooseneck ball includes a ball body 10, an installation body 20, and an anti-tilt body 30. The ball body 10 is configured to connect with a trailer ball cover, the installation body 20 is fixedly connected to the ball body 10 and configured to connect with an installation seat, and the anti-tilt body 30 is sleeved on an outer circumference of the ball body 10. When the ball body 10 is passed through a coupler and connected to the coupler, one side of the anti-tilt body 30 abuts against the coupler, and the other side of the anti-tilt body 30 abuts against the ball body 10. The ball body 10 does not coincide with an axis of the installation body 20.

The ball body 10 includes a ball portion 1 and a reinforcement portion 3. The ball portion 1 includes a ball segment 11, an arc-shaped platform segment 12, and a cylindrical segment 13. The ball segment 11, the arc-shaped platform segment 12, and the cylindrical segment 13 are fixedly connected in sequence. The ball segment 11 has a spherical shape, and the arc-shaped platform segment 12 is gradually decreased in diameter from one end near the cylindrical segment 13 to one end close to the ball segment 11. The cylindrical segment 13 has a cylindrical shape.

The reinforcement portion 3 includes two reinforcement ribs 31, a reinforcement top piece 32, and a reinforcement connection piece 33. The two reinforcement ribs 31 are fixedly provided on an outer circumference of the cylindrical segment 13 and are extended along the connection section 21. The two reinforcement ribs 31 are arranged parallel to each other, and the reinforcement top piece 32 is located at a top of the two reinforcement ribs 31. The reinforcement top piece 32 is fixedly arranged on an outer circumference of the cylindrical segment 13; one side of the reinforcement top piece 32 is fixedly connected to the two reinforcement ribs 31. One end of the reinforcement connection piece 33 is fixedly connected to the ball body 10, and the other end of the reinforcement connection piece 33 is fixedly connected to the installation body 20.

The installation body 20 includes an installation part 2, and the installation part 2 includes a connection section 21 and a main body section 22. The connection section 21 is fixedly connected to the cylindrical segment 13, and the main body section 22 is fixedly connected to the connection section 21. The main body section 22 is rectangular in shape, and a central hole 222 is provided in a middle of the main body section 22. Two sides of the main body section 22 facing each other are provided with connection holes 221 that are penetrated, and the two connection holes 221 are both connected to the central hole 222.

The anti-tilt body 30 in this embodiment of the application is a cushion pad, and a material of the cushion pad includes polyurethane material.

The implementation principle of this embodiment is as follows: when it is necessary to make the connection between the ball body 10 of the gooseneck ball and the coupler more stable and less prone to tilting, the installation body 20 is installed on the installation base at a rear of the vehicle, the anti-tilt body 30 is sleeved on the outer circumference of the ball body 10; one side of the anti-tilt body 30 abuts against the ball body 10. The ball body 10 is connected to the coupler; one side of the anti-tilt body 30 abuts against the ball body 10, and the other side of the anti-tilt body 30 abuts against the coupler, so that the anti-tilt body 30 is filled between the coupler and the ball body 10, so that the anti-tilt body 30 limits a swing between the ball body 10 and the coupler, rendering it difficult for the ball body 10 to swing relative to the coupler. This makes the ball body 10 less prone to tilting, thereby improving the connection between the ball body 10 and the coupler of the existing gooseneck ball during towing, which makes it easy for the gooseneck ball to tilt, and it is easy to cause traffic accidents when towing.

Referring to FIGS. 6 to 13, the ball body 10 coincides with an axis of the installation body 20.

The ball body 10 includes a ball portion 1 and a reinforcement portion 3. The ball portion 1 includes a ball segment 11, an arc-shaped platform segment 12, and a cylindrical segment 13. The ball segment 11, the arc-shaped platform segment 12, and the cylindrical segment 13 are fixedly connected in sequence. The ball segment 11 has a spherical shape, and the arc-shaped platform segment 12 is gradually decreased in diameter from one end near the cylindrical segment 13 to one other end near the ball segment 11. The cylindrical segment 13 has a cylindrical shape.

The reinforcement portion 3 includes four reinforcement ribs 31, a reinforcement top piece 32, and a reinforcement bottom piece 34. Each of the reinforcement rib 31 is fixedly provided on an outer circumferential surface of the cylindrical segment 13 and is extended along the first column section 23 along an outer circumferential surface of the cylindrical segment 13. The reinforcement top piece 32 is located at a top of each of the reinforcement ribs 31, and the reinforcement top piece 32 is fixedly provided on an outer circumferential surface of the cylindrical segment 13. One side of the reinforcement top piece 32 is fixedly connected to each of the reinforcement ribs 31, and the reinforcement bottom piece 34 is located at a bottom of each of the reinforcement ribs 31. The reinforcement bottom piece 34 is fixedly provided on an outer circumferential surface of the cylindrical segment 13 and is fixedly connected to one end of the first column section 23 close to the cylindrical segment 13. One dies of the reinforcement bottom piece 34 away from the first column section 23 is fixedly connected to the reinforcement ribs 31.

The reinforcement portion 3 can further include a reinforcement piece 35, the reinforcement piece 35 is located between the reinforcement top piece 32 and the reinforcement bottom piece 34. The reinforcement piece 35 is fixedly provided on an outer circumferential surface of the cylindrical segment 13, and is fixedly connected to each of the reinforcement ribs 31.

The installation body 20 includes an installation part 2, and the installation part 2 includes a first column section 23, a second column section 24, and a third column section 25. The first column section 23 is fixedly connected to one end of the cylindrical segment 13 away from the arc-shaped platform segment 12, and the first column section 23, the second column section 24, and the third column section 25 are fixedly connected from one end close to the cylindrical segment 13 towards one end away from the cylindrical segment 13. The first column section 23, the second column section 24, and the third column section 25 are all cylindrical in shape. A diameter of the first column section 23 is equal to a diameter of the third column section 25, and a diameter of the second column section 24 is smaller than a diameter of the first column section 23.

Referring to FIGS. 14 to 17, the ball body 10 coincides with an axis of the installation body 20 coincide.

The ball body 10 includes a ball portion 1 and a reinforcement portion 3. The ball portion 1 includes a ball segment 11, an arc-shaped platform segment 12, and a cylindrical segment 13. The ball segment 11, the arc-shaped platform segment 12, and the cylindrical segment 13 are fixedly connected in sequence. The ball segment 11 has a spherical shape, and the arc-shaped platform segment 12 is gradually decreased in a diameter from one end near the cylindrical segment 13 to one end near the ball segment 11. The cylindrical segment 13 has a cylindrical shape.

The reinforcement portion 3 includes four reinforcement ribs 31, a reinforcement top piece 32, and a reinforcement bottom piece 34. Each of the reinforcement ribs 31 is fixedly provided on an outer circumferential surface of the cylindrical segment 13 and is extended along an outer circumferential surface of the cylindrical segment 13 along the installation body 20. The reinforcement top piece 32 is located at a top of each of the reinforcement ribs 31, and the reinforcement top piece 32 is fixedly provided on an outer circumferential surface of the cylindrical segment 13. One side of the reinforcement top piece 32 is fixedly connected to each of the reinforcement ribs 31. The reinforcement bottom piece 34 is located at a bottom of each of the reinforcement ribs 31. The reinforcement bottom piece 34 is fixedly provided on an outer circumferential surface of the cylindrical segment 13 and is fixedly connected to one end of the installation body 20 close to the cylindrical segment 13. The reinforcement bottom piece 34 is fixedly connected to the reinforcement rib 31 on one side away from the installation body 20. Two weight reduction slot 341 that penetrate through are provided on the reinforcement bottom piece 34.

The reinforcement portion 3 can further include a reinforcement piece 35, and the reinforcement piece 35 is located between the reinforcement top piece 32 and the reinforcement bottom piece 34. The reinforcement piece 35 is fixedly provided on an outer circumferential surface of the cylindrical segment 13, and is fixedly connected to each of the reinforcement ribs 31.

The installation body 20 includes an installation part 2, one end of the installation part 2 is fixedly connected to the cylindrical segment 13. The installation part 2 is rectangular in shape, and a central hole 222 is provided in a middle of the installation part 2. Connection holes 221 are provided on two sides of the installation part 2 facing each other, and each of the connection holes 221 is connected to the central hole 222.

Referring to FIGS. 17 to 22, the ball body 10 coincides with an axis of the installation body 20.

The ball body 10 includes a ball portion 1 and a reinforcement portion 3. The ball portion 1 includes a ball segment 11, an arc-shaped platform segment 12, and a cylindrical segment 13. The ball segment 11, the arc-shaped platform segment 12, and the cylindrical segment 13 are fixedly connected in sequence. The ball segment 11 has a spherical shape, and the arc-shaped platform segment 12 is gradually decreased in diameter from one end near the cylindrical segment 13 to one end near the ball segment 11. The cylindrical segment 13 has a cylindrical shape.

The reinforcement portion 3 includes four reinforcement ribs 31, a reinforcement top piece 32, and a reinforcement bottom piece 34. Each of the reinforcement ribs 31 is fixedly provided on an outer circumferential surface of the cylindrical segment 13 and is extended along the first column section 23 along an outer circumferential surface of the cylindrical segment 13. The reinforcement top piece 32 is located at a top of each reinforcement ribs 31, and the reinforcement top piece 32 is fixedly provided on an outer circumferential surface of the cylindrical segment 13. One side of the reinforcement top piece 32 is fixedly connected to each of the reinforcement ribs 31, and the reinforcement bottom piece 34 is located at a bottom of each of the reinforcement ribs 31. The reinforcement bottom piece 34 is fixedly provided on the outer circumferential surface of the cylindrical segment 13 and is fixedly connected to one end of the first column section 23 close to the cylindrical segment 13. The reinforcement bottom piece 34 is fixedly connected to the reinforcement rib 31 on one side away from the first column section 23, and the reinforcement bottom piece 34 is provided with two weight reduction slots 341 that run through.

The reinforcement portion 3 can further include a reinforcement piece 35, the reinforcement piece 35 is located between the reinforcement top piece 32 and the reinforcement bottom piece 34. The reinforcement piece 35 is fixedly provided on an outer circumferential surface of the cylindrical segment 13, and is fixedly connected to each of the reinforcement ribs 31.

The installation body 20 includes an installation part 2 and a locking portion 4. The installation part 2 includes a first column section 23 and a second column section 24. The first column section 23 is fixedly connected to one end of the cylindrical segment 13 away from the arc-shaped platform segment 12. The first column section 23 and the second column section 24 are fixedly connected from one end close to the cylindrical segment 13 towards one end away from the cylindrical segment 13. Both the first column section 23 and the second column section 24 are cylindrical in shape, and a diameter of the second column section 24 is smaller than that of the first column section 23.

The locking portion 4 is provided at a middle position between the ball portion 1 and the installation part 2, and the locking portion 4 is slid and cooperates with the installation part 2. The locking portion 4 includes a locking rod 41, and the locking rod 41 includes a locking segment 411, a rod body section 412, a clamping section 413, a cylindrical segment 414, and a bottom section 415. The locking segment 411, the rod body section 412, the clamping section 413, the cylindrical segment 414, and the bottom section 415 are fixedly connected to each other from one end close to the ball portion 1 to one end close to the installation part 2. The locking portion 4 further includes three locking balls 42 and a locking spring 43. An outer circumference of the second column section 24 is provided with three locking holes 241 that run through and are evenly distributed around an axis of the second column section 24. The locking balls 42 are respectively threaded and slide fitted into each of the locking holes 241. One end of the locking spring 43 abuts against the second column section 24, and one other end of the locking spring 43 abuts against the bottom section 415.

When the installation part 2 is fixedly connected to the installation base, the locking rod 41 is slid in a direction close to the ball portion 1, so that the clamping section 413 slides each of the locking balls 42 along each of the locking holes 241 in a direction away from an axis of the second column section 24, until the locking segment 411 is fixedly connected to the ball portion 1, so that each of the locking balls 42 is fixedly connected to the installation base.

The ball body 10 coincides with an axis of the installation body 20.

The ball body 10 includes a ball portion 1, and the ball portion 1 includes a ball segment 11, an arc-shaped platform segment 12, and a cylindrical segment 13. The ball segment 11, the arc-shaped platform segment 12, and the cylindrical segment 13 are fixedly connected in sequence. The ball segment 11 is spherical, and the arc-shaped platform segment 12 is gradually decreased in a diameter from one end close to the cylindrical segment 13 to one end close to the ball segment 11. The cylindrical segment 13 is cylindrical, and the anti-tilt body 30 abuts against the ball portion 1.

An anti-tilt method for the anti-tilt gooseneck ball, including the following steps:

(a) installing the installation body 20 onto the installation base at a rear of the vehicle;

(b) placing the anti-tilt body 30 on the outer circumference of the ball body 10, and ensure that one side of the anti-tilt body 30 abuts against the ball body 10;

(c) connecting the ball body 10 to the coupler, one side of the anti-tilt body 30 abuts against the ball body 10 and the other side of the anti-tilt body 30 abuts against the coupler, so that the anti-tilt body 30 is filled between the coupler and the ball body 10 to prevent the ball body 10 from tilting easily.

The above are preferred embodiments of the present application and do not limit the protection scope of the present application. Therefore, any equivalent changes made according to the structure, shape, and principle of the present application should be included in the protection scope of the present application.

What is claimed is:

1. An anti-tilt gooseneck ball, comprising:

a ball body, configured to connect with a trailer ball coupler;

an installation body, which is fixedly connected to the ball body and configured to connect with an installation base; and an anti-tilt body, wherein the anti-tilt body is sleeved on an outer circumference of the ball body, and when the ball body is connected to the coupler, one side of the anti-tilt body abuts against the coupler, and the other side of the anti-tilt body abuts against with the ball body;

the ball body comprises a ball portion and a reinforcement portion comprising at least one reinforcement rib;

wherein the reinforcement portion comprises a reinforcement bottom piece, the reinforcement bottom piece is provided between the installation body and the reinforcement rib, the reinforcement bottom piece is connected to the ball portion, and one side of the reinforcement bottom piece is connected to the reinforcement rib.

2. The anti-tilt gooseneck ball according to claim 1, wherein the anti-tilt body is a cushion pad capable of buffering.

3. The anti-tilt gooseneck ball according to claim 2, wherein a material of the cushion pad comprises polyurethane material.

4. The anti-tilt gooseneck ball according to claim 1, wherein the anti-tilt body abuts against the ball portion.

5. The anti-tilt gooseneck ball according to claim 1, wherein the reinforcement portion is connected to an outer peripheral surface of the ball portion, and the anti-tilt body abuts against the reinforcement portion.

6. The anti-tilt gooseneck ball according to claim 5, wherein the reinforcement portion comprises a reinforcement top piece, the reinforcement top piece is connected to the ball portion, and the anti-tilt body abuts against the reinforcement top piece.

7. The anti-tilt gooseneck ball according to claim 6, wherein the reinforcement rib is fixedly provided on the ball portion and is extended to the installation body, and the reinforcement rib is connected to the reinforcement top piece.

* * * * *